US010972697B2

(12) United States Patent
Perelli et al.

(10) Patent No.: US 10,972,697 B2
(45) Date of Patent: Apr. 6, 2021

(54) PROJECTION SYSTEM

(71) Applicant: Lenovo (Singapore) Pte. Ltd., Singapore (SG)

(72) Inventors: Thomas Perelli, Raleigh, NC (US); Cuong Huy Truong, Cary, NC (US); Matthew Ian Tucker, Durham, NC (US); Samuel Jackson Patterson, Raleigh, NC (US); Seth Doughton Rumsey, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/157,084

(22) Filed: Oct. 10, 2018

(65) Prior Publication Data

US 2020/0120306 A1 Apr. 16, 2020

(51) Int. Cl.
*H04N 9/31* (2006.01)
*G03B 21/26* (2006.01)
*G06F 3/042* (2006.01)
*H04N 5/74* (2006.01)

(52) U.S. Cl.
CPC .......... *H04N 5/7416* (2013.01); *G03B 21/26* (2013.01); *G06F 3/042* (2013.01); *H04N 9/3173* (2013.01); *H04N 9/3185* (2013.01)

(58) Field of Classification Search
CPC ...... G03B 21/26; G06F 3/042; H04N 9/3173; H04N 9/3185; H04N 5/7416
USPC .......................................................... 353/70
See application file for complete search history.

(56) References Cited

U.S. PATENT DOCUMENTS

| 2002/0105623 | A1* | 8/2002 | Pinhanez | G03B 21/28 353/69 |
| 2011/0216288 | A1 | 9/2011 | Rutledge et al. | |
| 2012/0188451 | A1* | 7/2012 | Schmidt | A63H 33/006 348/553 |
| 2015/0070663 | A1* | 3/2015 | Watanuki | H04N 9/3188 353/70 |
| 2015/0208019 | A1 | 7/2015 | Stewart et al. | |
| 2016/0198552 | A1* | 7/2016 | Chen | H05B 37/0272 348/460 |
| 2017/0026612 | A1* | 1/2017 | Rintel | G06F 3/012 |

FOREIGN PATENT DOCUMENTS

JP         2014062418 A  *  4/2014  .............. E04H 1/02

OTHER PUBLICATIONS

Machine Translation of JP-201406218-A (Year: 2020).*
Application Report, Getting Started With TI DLP Display Technology, Literature Number: DLPA059C, Texas Instruments, Jan. 2015-Revised May 2018 (20 pages).
White Paper, Selecting Encoders and Other Feedback Devices, MICROMO, Faulhaber Group, Dec. 2015 (3 pages).

(Continued)

*Primary Examiner* — Jerry L Brooks
(74) *Attorney, Agent, or Firm* — Brian J. Pangrle

(57) ABSTRACT

A system can include a plank that includes an adjustable direction video projector; and circuitry operatively coupled to the adjustable direction video projector that selects one of a plurality of operational modes of the adjustable direction video projector and that adjusts a projection direction of the adjustable direction video projector responsive to selection of the one of the plurality of operational modes.

20 Claims, 18 Drawing Sheets

(56) References Cited

OTHER PUBLICATIONS

White Paper, How to Select a DC Motor: Brushless DC Motors, MICROMO, Faulhaber Group, Feb. 2014 (2 pages).
White Paper, Basic Feedback Guide, MICROMO, Faulhaber Group, Nov. 2013 (4 pages).
DC-Micromotor, Micro-Drives, Edition Aug. 14, 2015 (2 pages).
Stepper Motors, Dr. Fritz Faulhaber GmbH & Co, KG, Edition 2017 (2 pages).
User's Guide, TI DLP LightCrafter Display 2000 EVM, DLPU049C, Texas Instruments, Jul. 2017-Revised Oct. 2017 (15 pages).
FARO Products, Portable systems for measurement and 3D documentation, Revised Feb. 24, 2017 (EU-04REF203-151-EN) (21 pages).
LEICA BLK360, Imaging Scanner, Leica Geosystems AG, Apr. 2017 (1 page).
SwellPRO, Instruction of Waterproof Gimbal V1.1, May 2016 (9 pages).
User Manual, Handheld 3 Axis Gimbal Stabilizer H2, HDT(SZ)Co., Limited, Nov. 2017 (7 pages).

\* cited by examiner

PROJECTION SYSTEM

TECHNICAL FIELD

Subject matter disclosed herein generally relates to projection systems.

BACKGROUND

A projector can project light onto a wall for viewing by one or more individuals.

SUMMARY

A system can include a plank that includes an adjustable direction video projector; and circuitry operatively coupled to the adjustable direction video projector that selects one of a plurality of operational modes of the adjustable direction video projector and that adjusts a projection direction of the adjustable direction video projector responsive to selection of the one of the plurality of operational modes. Various other methods, apparatuses, systems, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
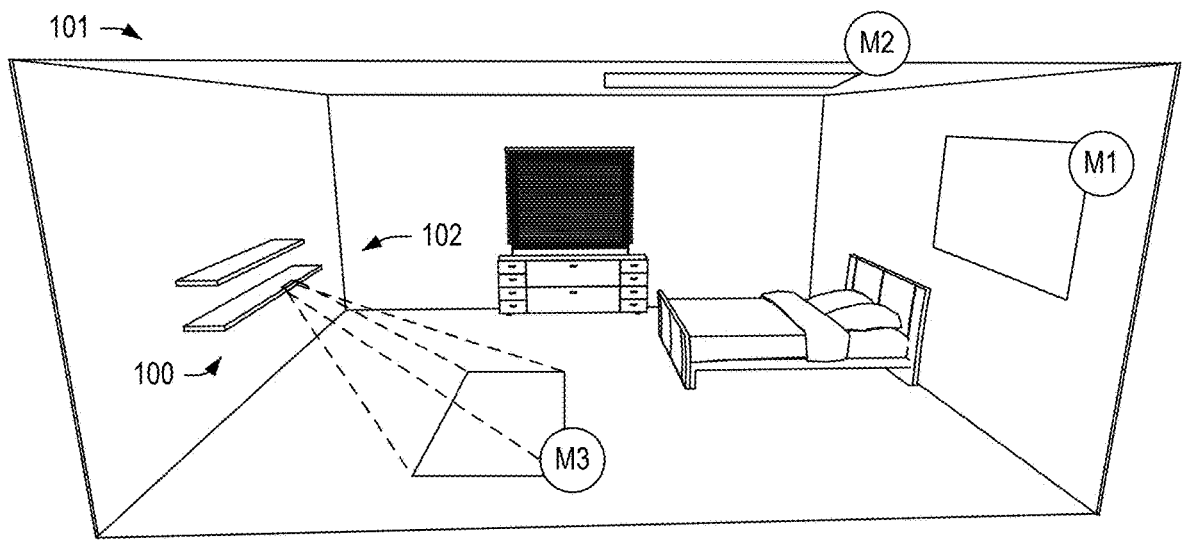
FIG. 1 is a diagram of an example of a system in an example of an environment along with examples of components and examples of circuitry.

FIG. 1 shows an example of a system 100 that includes an adjustable direction video projector 102. The system 100 may be referred to as a projection system. In the example of FIG. 1, the system 100 is present within an environment 101, which is shown as a bedroom (e.g., a bedroom environment). As to structures that can include a bedroom or bedrooms, consider a house, a condominium, an apartment, a ship, a boat, a recreational vehicle, a spacecraft, a hotel, a plane, etc. As shown in FIG. 1, the system 100 includes the adjustable direction video projector 102, which can be considered a sub-system of the system 100.

In the example of FIG. 1, the environment 101 includes a floor, a ceiling and walls where one of the walls includes a window and where another one of the walls includes a door (not shown). The window is shown as being covered by a window treatment, such as adjustable shades, blinds, drapes, etc. As an example, such a window treatment may optionally be electronic and optionally controllable via a controller, which may include wired and/or wireless communication circuitry. As an example, one or more components in an environment may be electronic and controllable (e.g., via one or more signals, etc.).

In the example of FIG. 1, the environment 101 includes furniture, which includes a bed. Such a bed may be of a particular size, for example, a twin, a queen, a king, etc. The furniture in the environment 101 also includes, positioned below the window, a dresser with a flat horizontal top, which may be referred to as a plank; and one or more wall selves, which are flat and horizontal, each of which may be referred to as a plank. As shown in the example of FIG. 1, the system 100 is present as a wall shelf that is mounted to one of the walls (e.g., opposite the bed). As to mounting, the system 100 can include one or more pieces of hardware and/or one or more other features that provide for wall mounting. As an example, the system 100 can be positionable. For example, consider positioning the system 100 on the flat and horizontal top of the dresser or another piece of furniture. In such an example, an individual may pick up the system 100, carry it to the dresser and place it on top of the dresser. The system 100 may include a battery that can power circuitry, which may include wireless communication circuitry. In such an example, the system 100 may be positionable and operable optionally without being plugged into an outlet or outlets (e.g., power, data, etc.).

As shown in the example of FIG. 1, the system 100 can include a housing 103 (e.g., or housings), one or more materials 104, one or more finishes 106 (e.g., material finishes, etc.), one or more pieces of hardware 108 (e.g., furniture type hardware), one or more other features 109. For example, the housing 103 can be shaped as a cuboid, parallelepiped, etc., which may be made of one or more of the one or more materials 104, which can include one or more of the one or more finishes 106. As an example, the housing 103 can include a frame or frames, which can support circuitry and provide integrity. For example, consider a metallic frame with wood veneer that forms a housing for circuitry where such circuitry includes an adjustable direction video projector.

As shown in the example of FIG. 1, the system 100 can include various components such as, for example, one or more of circuitry 130, one or more illumination sources 132, one or more power sources 134, one or more sensors 136, and one or more interfaces 138 (e.g., wired and/or wireless interfaces, etc.). The adjustable direction video projector 102, for example, as a sub-system, can include one or more of the features, components, etc., shown in FIG. 1. For example, the adjustable direction video projector 102 can include or be operatively coupled to one or more of the components 130, 132, 134, 136 and 138.

As an example, the circuitry 130 can include mode circuitry 140 that can include circuitry for one or more operational modes of the system 100. For example, consider one or more of a wall mode 142, a ceiling mode 144, a floor mode 146 or one or more other types of modes 148. As an example, the circuitry 130 can include adjustment circuitry 160 that can include circuitry for one or more adjustments for projection or projections made by the system 100. For example, consider one or more of a lens or lenses adjustment 162, a unit or units adjustment 164 or one or more other types of adjustment 166. As an example, the adjustment circuitry 160 can include and/or be operatively coupled to one or more electric motors, which can be operatively coupled to one or more components of an adjustable direction video projector that can project video in at least one operational mode.

Figure 13:
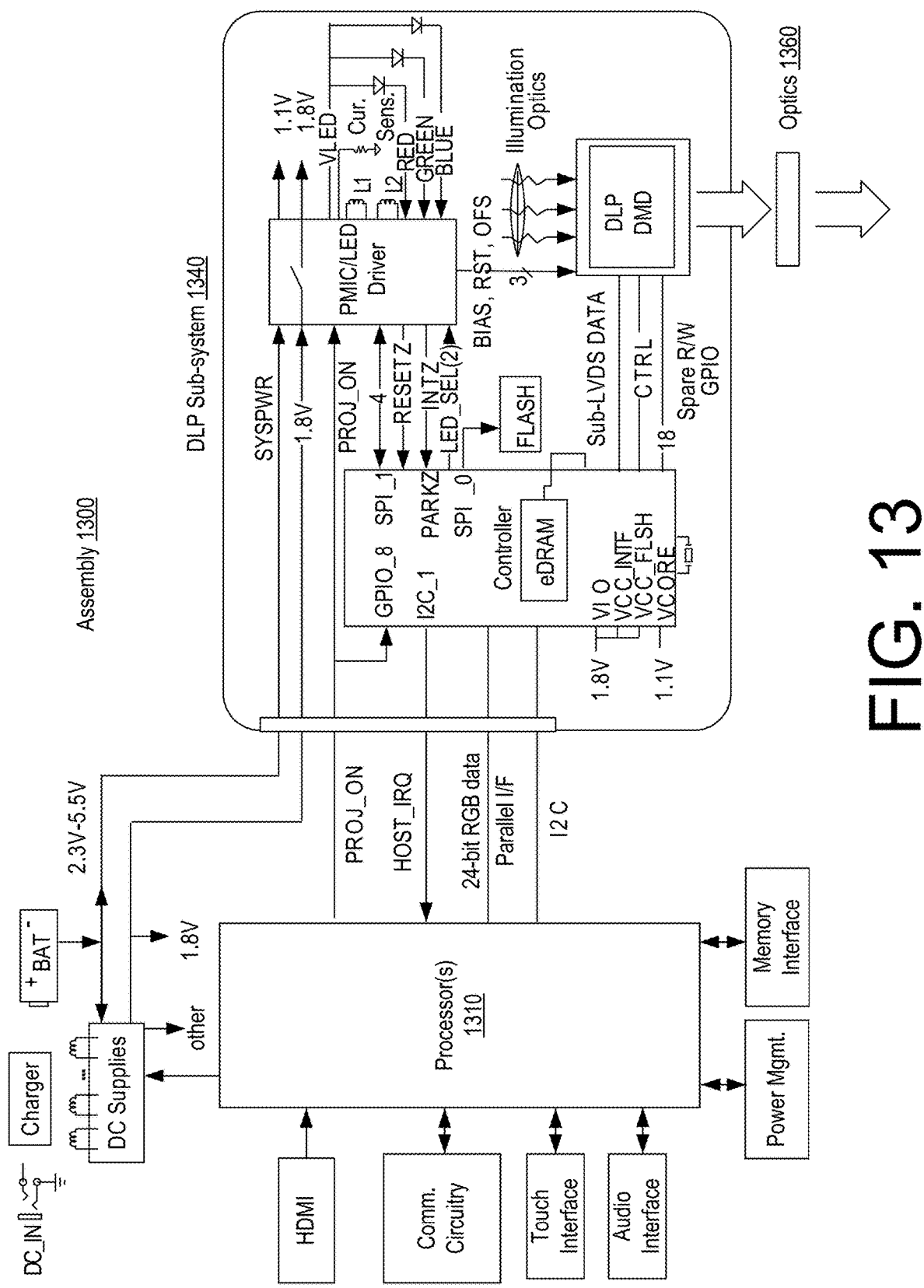
FIG. 13 is a diagram of an example of an assembly.
Figure 14:
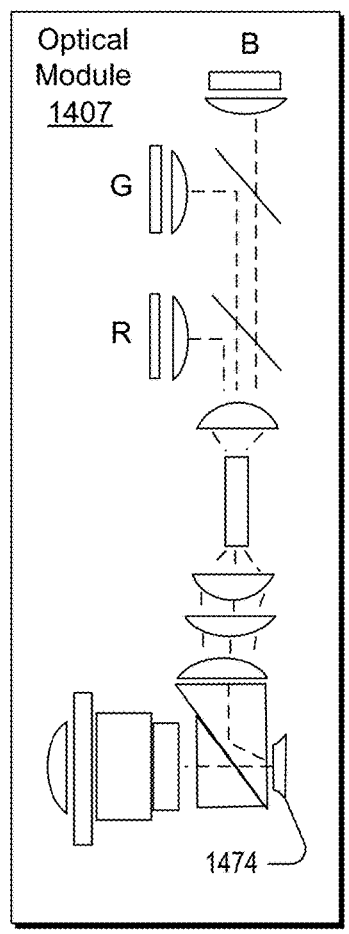
FIG. 14 is a diagram of an example of circuitry and an example of an optical module.
Figure 14:
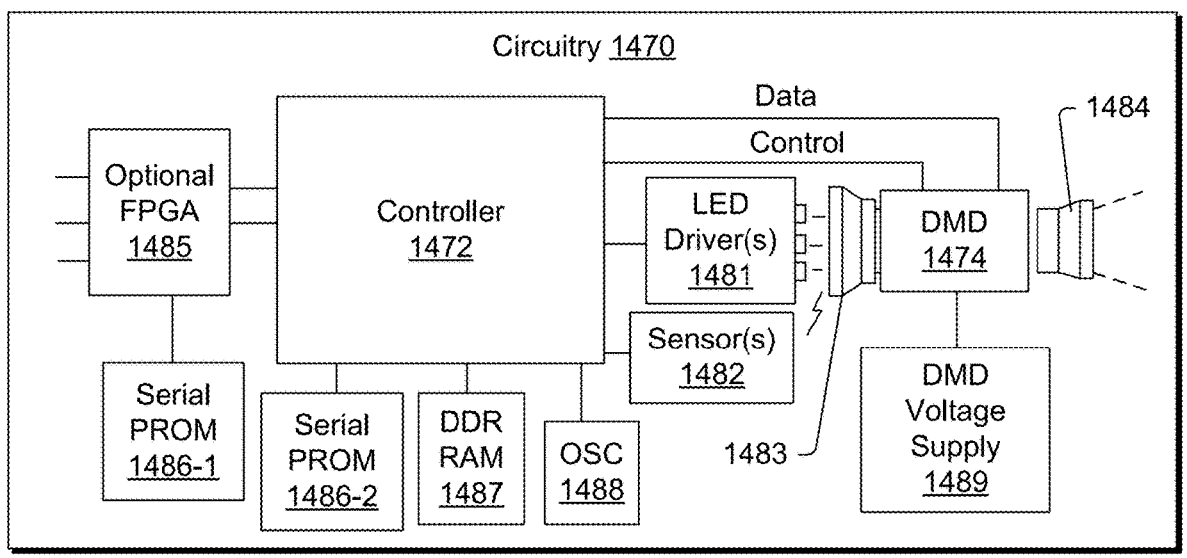
Figure 15:
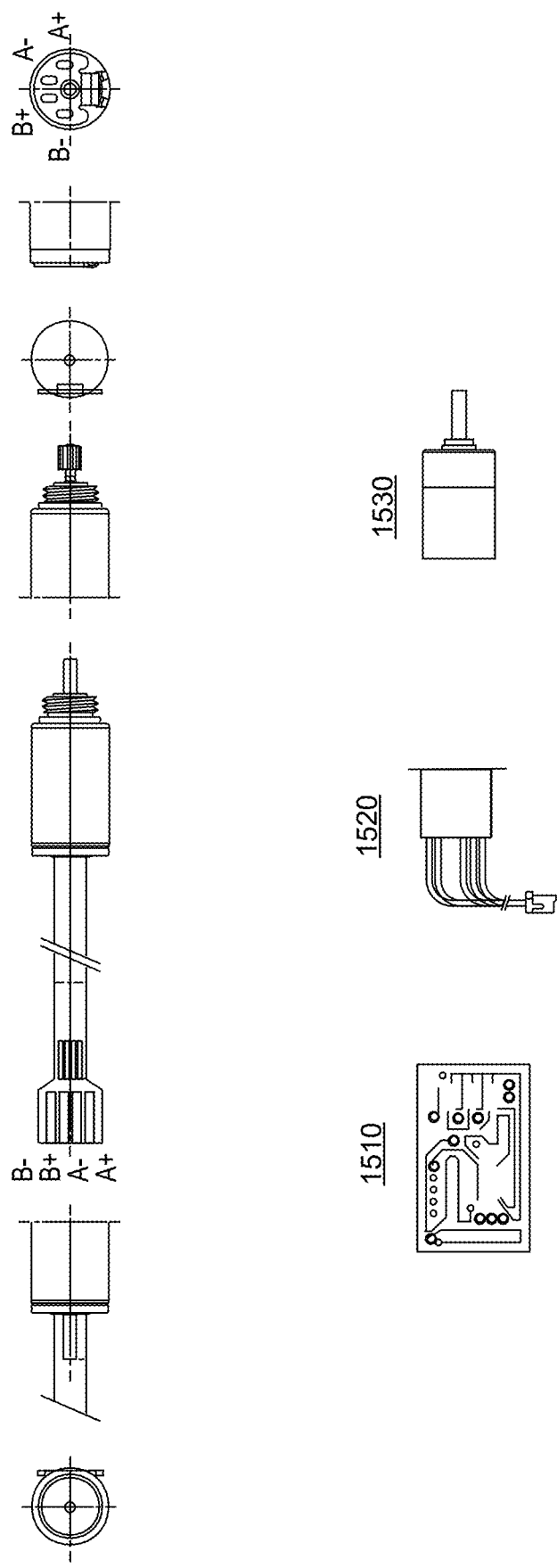
FIG. 15 is a diagram of an example of an adjustment assembly.
Figure 16:
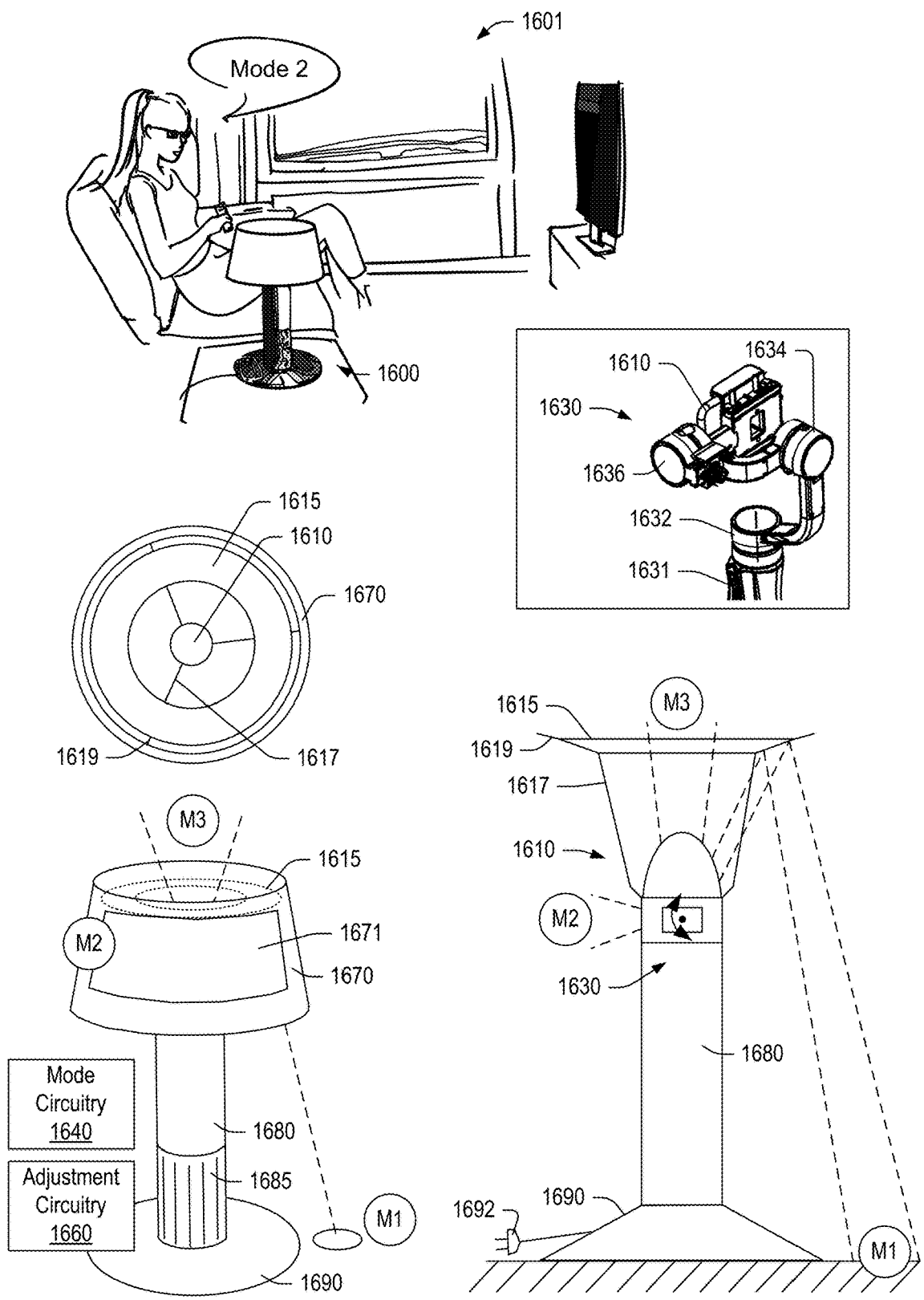
FIG. 16 is a diagram of an example of a system and an example of an adjustment mechanism that includes a plurality of electric motor.
Figure 18:
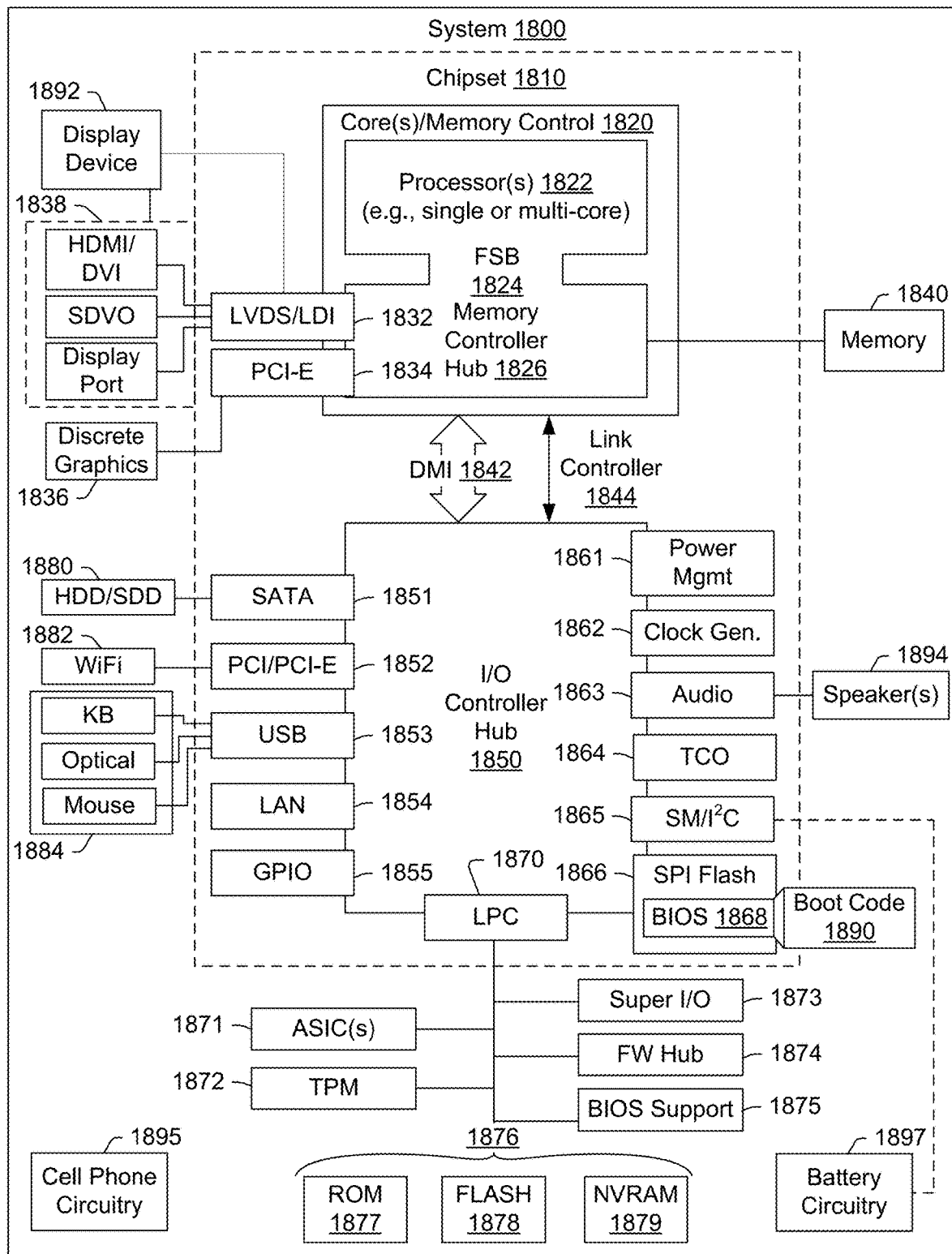
FIG. 18 is a diagram of an example of a system.

As an example, the circuitry 130 can include one or more examples of types of circuitry such as, for example, circuitry of FIG. 13, circuitry of FIG. 14, circuitry of FIG. 15, circuitry of FIG. 16, circuitry of FIG. 18, etc. As an example, the circuitry 130 can include one or more processors 1310 of an assembly 1300 of FIG. 13 where, for example, one or more interfaces can be operatively coupled to one or more other components for purposes of mode selection, adjustment of an adjustable direction video projector, projection of information via the adjustable direction video projector, etc. For example, FIG. 13 shows the one or more processors 1310 being operatively coupled to a digital light processing (DLP) sub-system 1340; noting that the one or more processors 1310 may be operatively coupled to one or more electric motors (see, e.g., FIG. 2, FIG. 15, FIG. 16, etc.), which can be part of one or more adjustment mechanisms that can direct output of the DLP sub-system 1340. As an example, the mode circuitry 140 and/or the adjustment circuitry 160 may be implemented in an assembly such as the assembly 1300 of FIG. 13 and/or in an assembly that includes one or more features of the assembly 1300 of FIG. 13. As an example, a system with an adjustable direction video projector can include one or more features of a system such as the system 1800 of FIG. 18.

Referring to the environment 101, examples of modes, as may be associated with the mode circuitry 140, include a wall mode M1, a ceiling mode M2 and a floor mode M3. In the example of FIG. 1, the system 100 can project to one or more locations on a wall or walls in the wall mode, can project to one or more locations on a ceiling in the ceiling mode, and can project to one or more locations on a floor in the floor mode.

As an example, the system 100 can include a plank that includes the adjustable direction video projector 102 and the circuitry 130 operatively coupled to the adjustable direction video projector that selects one of a plurality of operational modes of the adjustable direction video projector (e.g., one or more of a group of modes such as, for example, M1, M2, M3, etc.) and that adjusts a projection direction of the adjustable direction video projector responsive to selection of the one of the plurality of operational modes. For example, an operational mode can be selected via the mode circuitry 140 and a projection direction of the adjustable direction video projector 102 adjusted responsive to selection of the operational mode. As an example, a plank can be a housing or part of a housing.

As an example, selection of one of a plurality of operational modes can occur responsive to a signal, which may be an electrical signal (e.g., digital and/or analog) and/or a data signal (e.g., a command, a command with data, etc.). As an example, a signal can be generated at least in part via a sensor or sensors. As an example, a signal can be generated at least in part via a schedule or schedules. As an example, a signal can be generated at least in part via an interface or interfaces. As an example, a signal can be generated at least in part via one or more of a sensor, a schedule and an interface. As an example, a sensor can be a detector or another type of sensor. As an example, a schedule can be a data structure stored in a memory device where the data structure includes information organized with respect to time (e.g., time of day, time of week, time of month, time of year, season, temperature, weather, power usage, etc.). As an example, an interface can be a communication interface, which can be wired, wireless or a combination of wired and wireless.

As to the housing 103, it can be shaped from a selection of one or more shapes. For example, in FIG. 1, the system 100 includes a plank shaped housing such that the system 100 can be referred to as a plank system. A plank can have a substantially rectangular shape in a plan view and can be defined in part by a thickness. As an example, the thickness of a plank can be less than a dimension of the plank as in a plan view. For example, in a Cartesian coordinate system of x, y and z, a z dimension can be thickness where thickness is less than an x dimension and less than a y dimension of a housing that is a plank housing. A plank can be suitable for positioning on and/or integration with one or more pieces of furniture, which can include movable furniture and/or permanently installed furniture. An example of a permanently installed piece of furniture can be, for example, a kitchen countertop or a kitchen cabinet. In terms of rules, regulations, laws, etc., for example, as to real estate, building codes, taxes, etc., a piece of furniture may be considered to be a "fixture". For example, a kitchen countertop can be a fixture and a kitchen cabinet can be a fixture. As an example, a hearth of a fireplace can be considered a fixture and a mantel of a fireplace can be considered a fixture.

An element of a structure can be considered a fixture, for example, if it is permanently affixed to a wall, a ceiling, or a floor by using one or more of nails, glue, cement, pipes, screws, etc. In some instances, even if easily removable, the method used to attach the element might make the element a fixture. For example, ceiling lights, although attached by wires, can be removed, but the lights are generally considered a house fixture.

As an example, the system 100 can be utilized as a fixture. For example, consider the system 100 being integrated into a kitchen countertop, a hearth of a fireplace, a mantel of a fireplace, etc. As an example, the system 100 can be utilized as a part of a fixture where the system 100 is at least in part separable from the fixture. As mentioned, the system 100 may be transportable to be positionable on one or more pieces of furniture, which may include one or more fixtures and/or one or more non-fixtures.

As to the one or more materials 104, consider one or more of natural, synthetic and composite materials. As to natural materials, consider wood, stone, glass, metal, alloy, etc. As to synthetic materials, consider one or more polymeric materials. As to composite materials, a composite material can include natural and/or synthetic materials.

As to one or more finishes 106, consider a glass finish, a wood finish, a metal finish, an alloy finish, a film finish (e.g., a laminate film, etc.), a polished finish, a rough finish (e.g., wood, stone, other), a textured finish, etc.

As to one or more pieces of hardware 108, consider one or more of screws, bolts, sliders, rails, mounts, hinges, handles, buttons, knobs, levers, etc.

Figure 2:
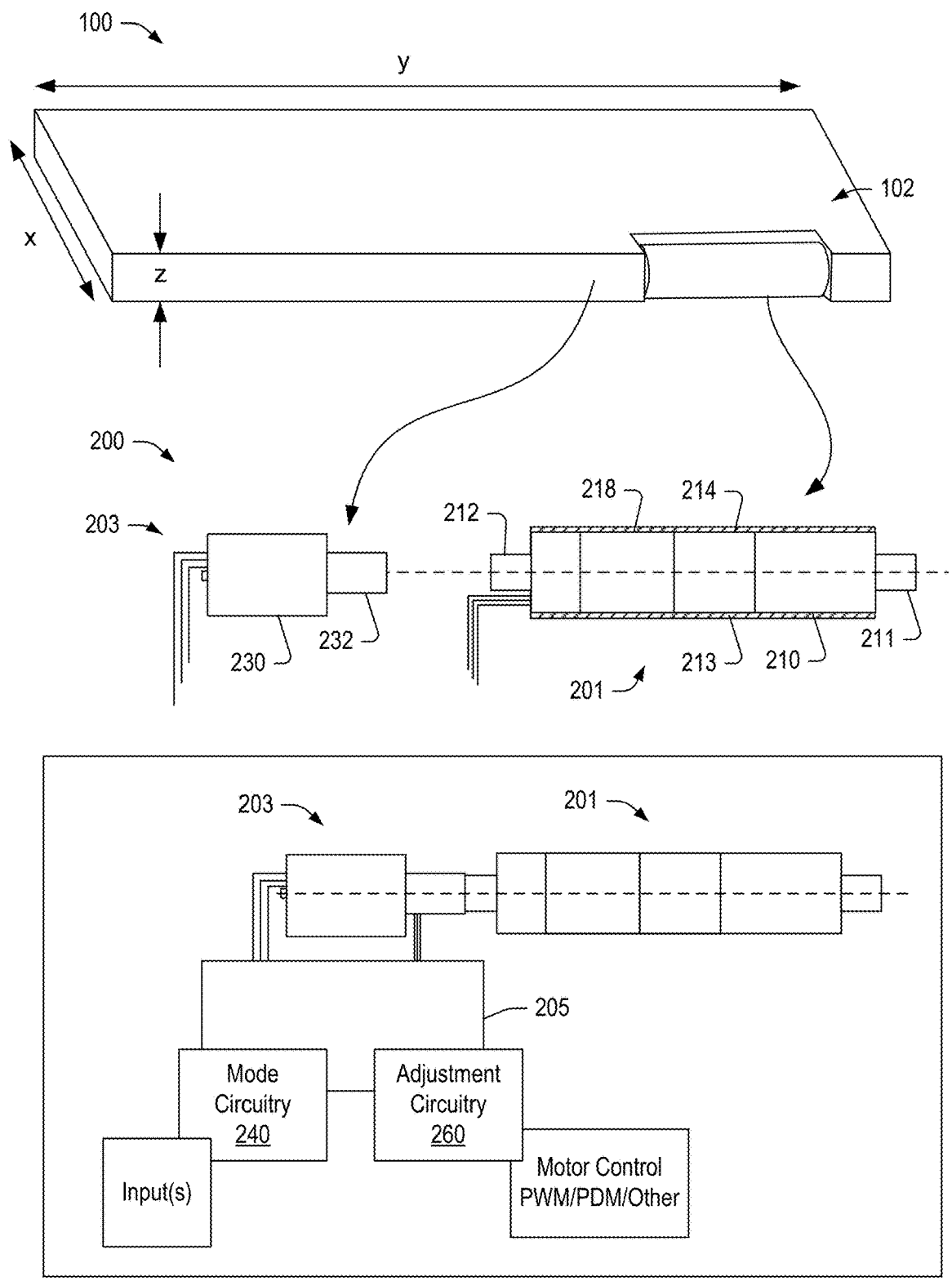
FIG. 2 is a series of diagrams of an examples of components of an example of a system.

FIG. 2 shows an example of the system 100 and an example of a sub-system 200 of the system 100, which includes an example of the adjustable direction video projector 102. As shown, the sub-system 200 includes a projection assembly 201 and an adjustment assembly 203, which can be operatively coupled such that the adjustment assembly 203 can adjust one or more components of the projection assembly 201.

As shown, the projection assembly 201 includes a core 210 with journals 211 and 212 where at least a portion of the core 210 (e.g., one or more components of the core 210) are adjustable via rotation along a rotational axis and/or another axis or axes and/or via translation along the rotational axis and/or another axis or axes. As an example, the journals 211 and 212 may be supported by sockets, which can be part of a housing such as a frame of a housing. As an example, one or more bearings (e.g., roller element bearings) may be utilized for rotatably supporting one or more components of the projection assembly 201. As an example, one end of the projection assembly 201 may be supported by a feature (e.g., a bearing, a socket, etc.) formed by or carried by the housing and another end of the projection assembly 201 (e.g., an opposing end) may be operatively coupled to the adjustment assembly 203 for support and adjustment.

As shown, the projection assembly 201 includes optics 214 and illumination circuitry 218 where the illumination circuitry 218 can generate illumination that can be directed by the optics 214, which can include one or more lenses (e.g., one or more optical elements). As an example, an adjustment can be an adjustment to at least a portion of the illumination circuitry 218. As an example, an adjustment can be an adjustment to at least a portion of the optics 214. As an example, an adjustment can be an adjustment to at least a portion of the illumination circuitry 218 and at least a portion of the optics 214.

As an example, the core 210 may be rotatable about the longitudinal axis shown in the example of FIG. 2. As an example, wires, an interface(s), etc., can be made between one or more components of the assembly 201 and circuitry 205 for one or more purposes (e.g., power, information, video data, etc.). As an example, the circuitry 205 may include one or more features of the circuitry 130 of FIG. 1.

As shown, the projection assembly 201 includes a sleeve 213, which may be a transparent material formed substantially as a cylinder or other shape. The sleeve 213 may be stationary or it may be adjustable. As an example, where the sleeve is stationary 213, one or more adjustable components may be internal to the system 100 such that adjustment does not catch an object such as a string, a hair, etc. and/or such that adjustment is not hindered by an object such as a book on the system 100, etc. As an example, the sleeve 213 can be made of glass or a polymeric material.

As shown, the adjustment assembly 203 includes a motor 230 and a coupling 232, which can include one or more gears, bands, etc. For example, the coupling 232 may be a transmission that can optionally be an adjustable transmission. A transmission can convert a number of degrees of rotation of a shaft of the motor 230 to a number of degrees of rotation of a coupling component where the number of degrees may differ. For example, consider the motor 230 being a stepper motor that has twenty steps for a 360 degree (full rotation) of a shaft of the motor 230. The coupling 232 can include components that can reduce the number of degrees per step from 18 degrees per step to less than 18 degrees per step. In such a manner, the stepper motor can be controlled in a manner that allows for fine adjustment of the projection assembly 201. As an example, consider fine adjustment at a number of degree increments such as one or more of less than 18 degrees, less than 12 degrees, less than 6 degrees, less than 3 degrees, less than or equal to one degree.

As an example, a motor can be a brushless DC electric motor, which may be an electronically commutated motor or synchronous DC motor. As an example, a motor may be powered by DC electricity via an inverter or switching power supply which produces an AC electric current to drive each phase of the motor via a controller (e.g., closed loop). As an example, a controller can provide pulses of current to the motor windings that control the speed and torque of the motor.

As an example, a brushless DC electric motor may be utilized to adjust a direction of one or more components of an adjustable direction video projector. As an example, an adjustment assembly can include one or more electric motors. As an example, an adjustment assembly can include one or more features of a motorized gimbal such as, for example, a gimbal configured for a video camera of a drone or a handheld gimbal for a video camera (see, e.g., FIG. 16).

Figure 17:
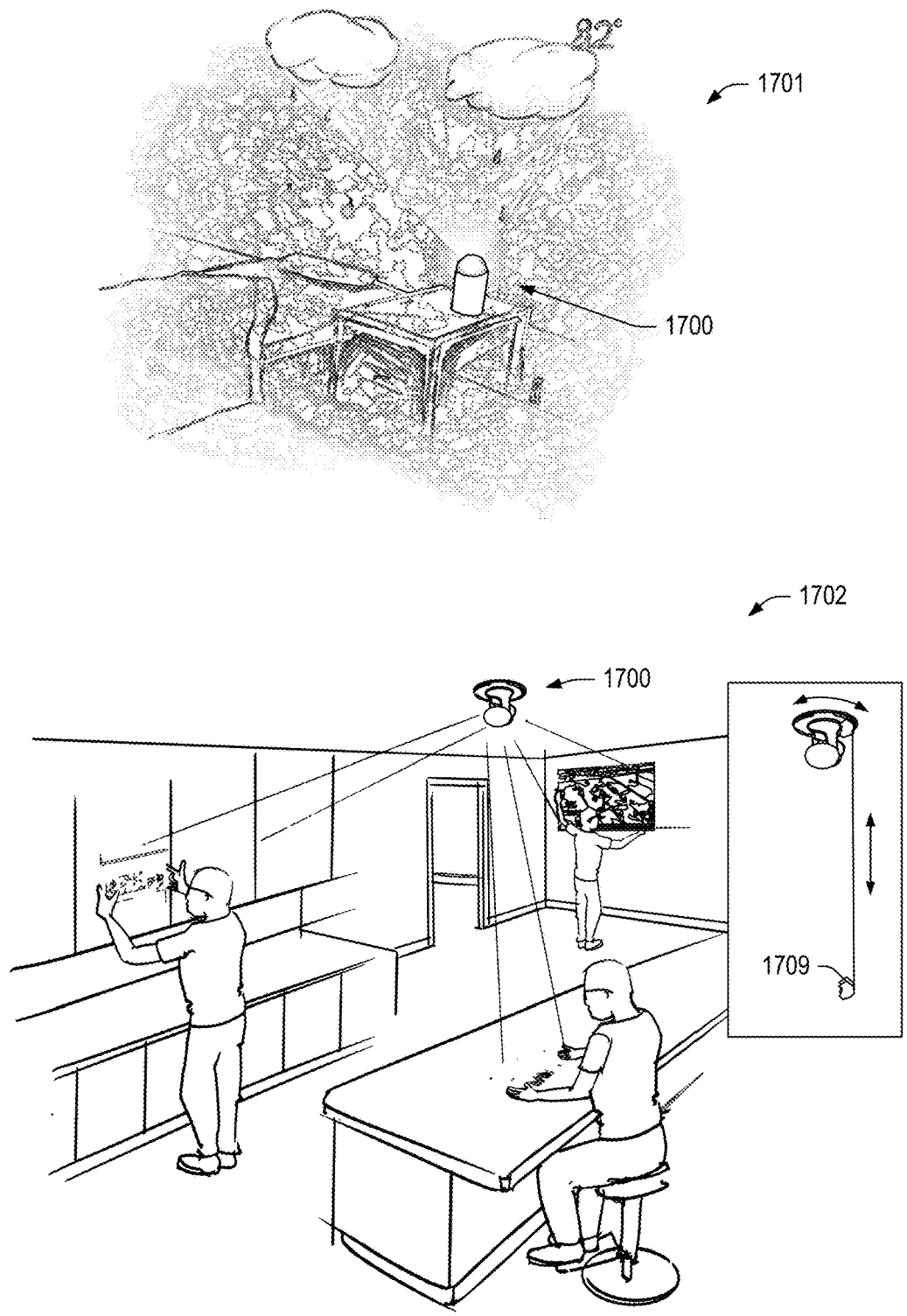
FIG. 17 is a diagram of an example of a system in an example of an environment and an example of the system in another example of an environment.

As an example, a gimbal mechanism with electric motors can be adapted for use in a system such as a plank system or another type of system (see, e.g., FIG. 16 and FIG. 17). As an example, a gimbal mechanism with electric motors may be utilized to help stabilize an adjustable direction video projector, for example, where it may be part of a ship, a boat, a recreational vehicle (RV), a plane, or another type of vehicle. For example, consider a plank system that includes a gimbal assembly that can stabilize one or more components of an adjustable direction video projector when on a ship or other marine vessel. In such an example, where water movement or other movement (e.g., hitting waves, tacking, etc.), the gimbal assembly can provide for a more stable viewing experience, which may help to reduce discomfort (e.g., motion sickness, etc.). Further, where such a system is in a galley or kitchen or, for example, in an environment where safety may be a concern (e.g., an emergency mode), stabilization may help to read information.

As an example, wires, an interface(s), etc., can be made between one or more components of the assembly 203 and the circuitry 205 for one or more purposes (e.g., power, information, video data, etc.).

FIG. 2 shows the assemblies 201 and 203 operatively coupled to form an adjustable direction video projector such as the adjustable direction video projector 102 of FIG. 1; noting that one or more other pieces of equipment, assemblies, etc., may be utilized to form an adjustable direction video projector suitable for use in the system 100.

As shown in FIG. 2, the assemblies 201 and 203 are operatively coupled to the circuitry 205, which is shown to include mode circuitry 240 and adjustment circuitry 260 (see, e.g., the mode circuitry 140 and the adjustment circuitry 160 of FIG. 1). As shown, the mode circuitry 240 can include one or more interfaces for inputs and the adjustment circuitry 260 may operate according to a motor control scheme, which can include pulse width modulation, pulse duration modulation, and/or one or more other types of schemes. As mentioned, the adjustment assembly 203 can be a stepper motor, which may be operable in clockwise, counter-clockwise or clockwise and counter-clockwise directions. For example, the circuitry 205 can adjust the motor 230 and hence one or more components of the projection assembly 201 in a clockwise manner, in a counter-clockwise manner or sequentially in a clockwise and counter-clockwise manner or vice versa.

As an example, the assembly 201 can be adjusted via the adjustment circuitry 260 responsive to selection of a mode via the mode circuitry 240. For example, the mode circuitry 240 can respond to input to select the mode M1 as in FIG. 1 where the adjustment circuitry 260 adjusts the assembly 201 via issuance of signals to the assembly 203. For example, a signal or signals as to a number of steps of a stepper motor can be issued to the assembly 203 to thereby aim the optics 214 of the assembly 201 to be directed to the wall as a projection direction. Where another input is received by the mode circuitry 240, the adjustment circuitry 260 can instruct the assembly 203 similarly to effectuate a different projection direction of the optics 214. As mentioned, an adjustment may be to one or more of optics 214 and illumination circuitry 218, for example, depending on configuration of the assembly 201.

As an example, a mode may be selected in one or more manners. For example, consider selection via one or more of a schedule, a remote control, and a user interface. As an example, a schedule may be stored in local memory of a system or remote memory and communicated to the system. Such a schedule may include modes such as M1, M2 and M3 of FIG. 1 being limited by time of day, actuated by time of day, de-actuated by time of day, etc. For example, the mode M3 may be a night-light mode that is limited to nighttime (e.g., a period from sundown to sunrise, etc.). As an example, a remote control may be a dedicated remote control or a non-dedicated remote control, which may optionally be an "app", as executable on a mobile device, etc. (e.g., a tablet, a smartphone, etc.). As to a user interface, a system can include one or more types of user interfaces such as touch sensing, voice sensing, motion sensing, etc.

Figure 3:
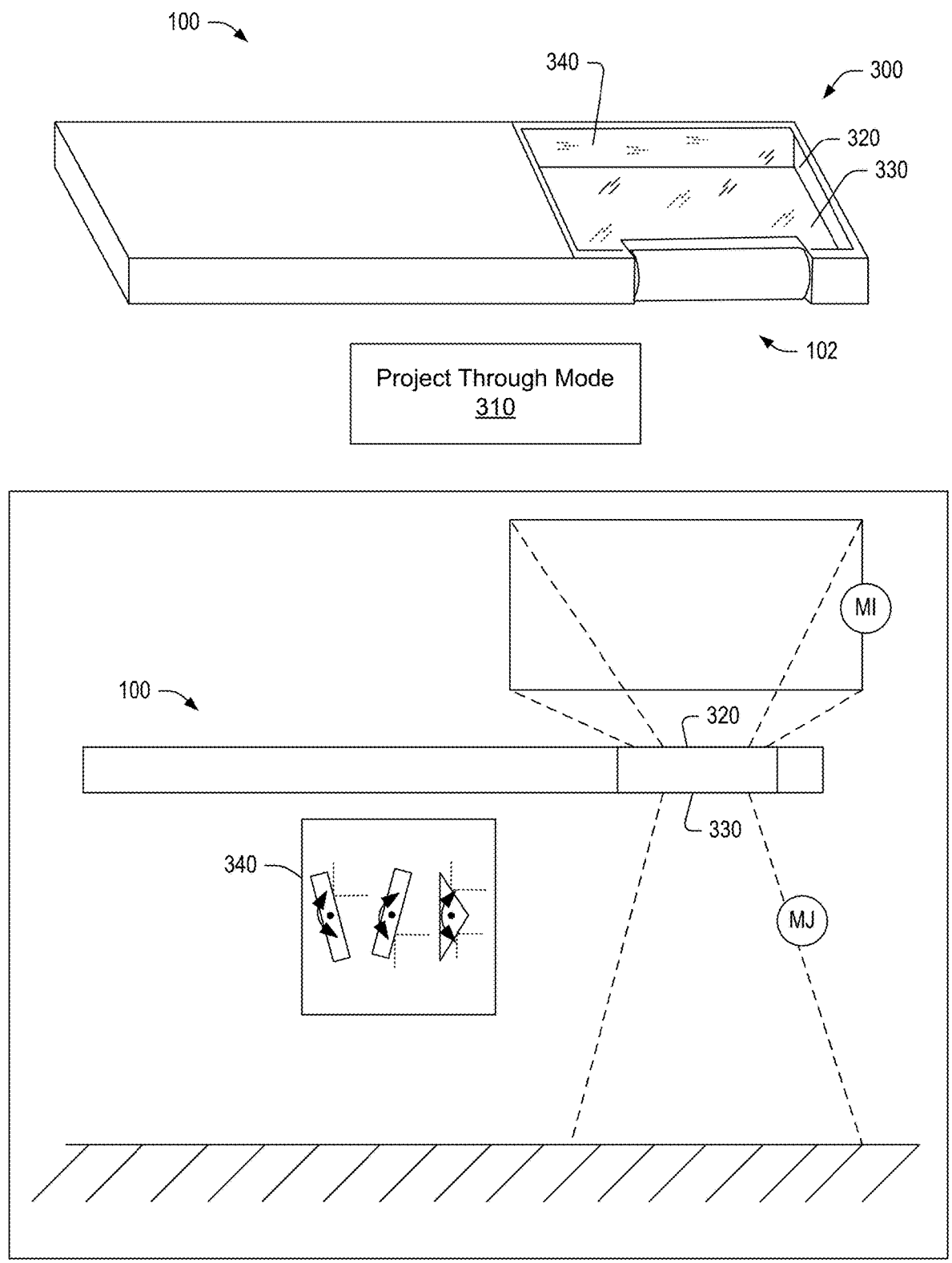
FIG. 3 is a series of diagrams of an example of a system.

FIG. 3 shows an example configuration of the system 100 where one or more transparent materials are included as a portion 300 of the system 100, which may optionally be adjustable in their optical characteristics. As shown, an upper transparent material 320 and/or a lower transparent material 330 may be utilized, where the portion 300 optionally includes a mirror material 340, which may be an adjustable mirror material (e.g., physically as to direction and/or as to optical characteristics).

FIG. 3 shows an example of mode referred to as a project through mode 310. As shown, the project through mode 310 can include a mode MI and a mode MJ, where the mode MI projects through the transparent material 320 and where the mode MJ projects through the transparent material 330. As an example, a reflection project through mode may be achieved using the mirror material 340, which may be adjustable to effectuate a mode or modes, which can project through at least one of the transparent materials 320 and 330. As an example, the mirror material 340 can include a split projection mode where a portion of the mirror material 340 is angled upwardly and where another portion of the mirror material 340 is angled downwardly. In such an example, the modes MI and MJ may be effectuated at the same time (e.g., simultaneously). For example, consider MJ as being a floor projection mode for a menu (e.g., instructions, etc.) while MI is a wall projection mode for content. In such an example, a user may stand at the system 100, which may be a wall mounted, etc., and look down for instructions that can be entered using a human input device (HID) to cause selection of content, etc., which can be projected to the wall in the mode MI. As to an HID, consider a mobile phone app, a tablet app, a computer app, a surface of the system 100 (e.g., upper touch surface, an edge touch surface, a touch-screen surface, etc.), a microphone, a motion sensor, and/or a remote control (e.g., with buttons, etc.).

As an example, the mirror material 340 may be adjustable to be planar and aimed in a direction and/or be triangular with two planar surfaces aimed in two different directions. As an example, the mirror material 340 may be rotatable to rotate a planar side and/or to rotate a triangular side that can reflect two images. As to two images, an assembly such as the assembly 201 can be coordinate with the triangular side to project information toward one of the planar surfaces of the triangular side (e.g., menu information, etc.) and to project other information toward the other of the planar surfaces of the triangular side (e.g., content, etc.). As an example, mode circuitry can be coordinated with circuitry that controls the mirror material 340 where such material is included along with the transparent materials 320 and 330. As an example, circuitry that controls a mirror material can be operatively coupled to or part of adjustment circuitry. As an example, the mirror material 340 can be of a prism shape (e.g., a long bar with a triangular cross-section). In FIG. 3, an inset diagram shows some examples of a cross-sectional or end view of the mirror material 340 as including planar surfaces, optionally with a triangular cross-section, where it may be rotatable to utilize a flat opposing surface for one or more modes that project through the material 320, the material 330 and/or both materials 320 and 330.

Figure 4:
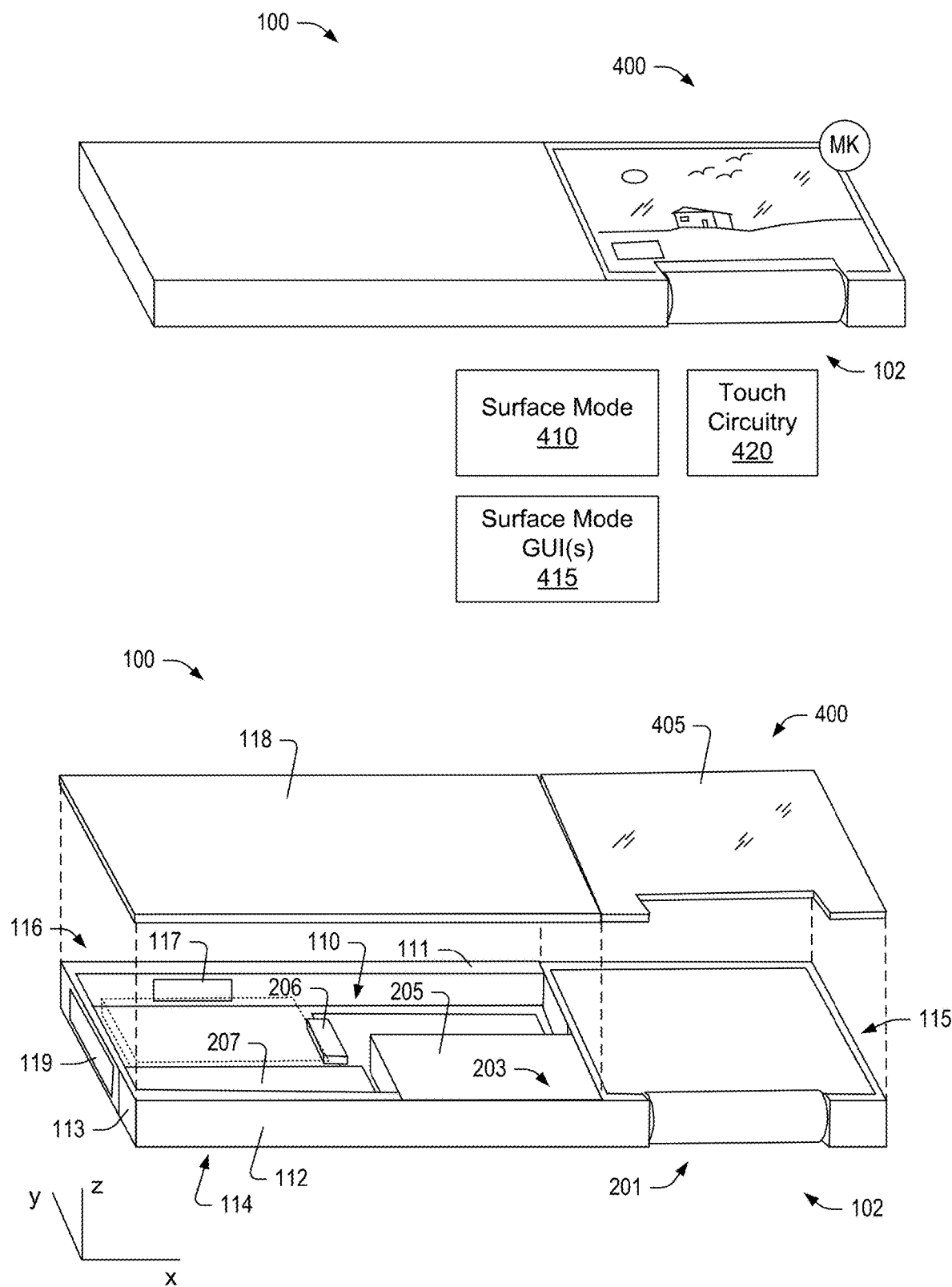
FIG. 4 is a diagram of an example of a system and a partially exploded perspective view of an example of a system.

FIG. 4 shows an example of the system 100 as including a portion 400 for utilization in a surface mode 410 (e.g., mode MK). As shown, the surface mode 410 can have one or more associated graphical user interfaces (GUIs) 415 and the portion 400 can include touch circuitry 420. For example, the portion 400 can include a touch screen display, which may be driven by circuitry of the assembly 201 or by other circuitry. As an example, consider the transparent material 320 of the example of FIG. 3 where the transparent material 320 can transition to an opaque material to be utilized as a projection screen. In such an example, the assembly 201 may be utilized to back-project onto the material 320 as in a back-projection mode. In such an example, one or more circuits may be utilized to effectuate the touch circuitry 420. As an example, circuitry such as that of a touch-screen display as on a cell phone or a tablet computing device may be utilized.

As an example, the mode MK of FIG. 4 may be a set-up mode for programming one or more features of the system 100. For example, consider a schedule set-up process that includes rendering one or more of the GUIs 415 to the surface shown in the example of FIG. 4. In such an approach, a user may readily navigate features and set parameters, schedules, etc.

FIG. 4 also shows an approximate exploded perspective view of an example of a system such as the system 100. As shown, the system 100 can include one or more cavities 110 that can be defined in part by a frame 111, which can be a metal frame such as a stamped aluminum frame, for example, with machined features. As an example, the frame 111 can include sides that may be exposed and/or that may be covered.

As shown in FIG. 4, the system 100 includes a front side 112, a left side 113, a bottom side 114, a right side 115, a back side 116 and a top side 118, which is shown in a detached state; noting such a side may optionally be hinged (e.g., hinged to the frame 111, etc.). In the example of FIG.

4, the portion 400 can include a material or display assembly 405, which can be seated into the system 100 and supported at least in part by the frame 111. As an example, the material or display assembly 405 can provide for rendering of one or more GUIs for one or more modes of operation of the system 100.

In the example of FIG. 4, the frame 111 can provide integrity such that the system 100 may optionally be mounted to a wall where the mass of the system 100 may be supported via one or more mounts, which may be or include one or more back side mounts. As an example, a mount or mounts may optionally include a left side and/or a right side mount. As mentioned, a system such as the system 100 may be part of a piece of furniture, for example, a furniture top, a countertop, etc.

As an example, the system 100 can include one or more processors and memory accessible to the one or more processors. As mentioned with respect to FIG. 2, circuitry such as the circuitry 205 can include one or more processors and/or one or more memory devices accessible to at least one or more processors. As mentioned, the circuitry 205 can be operatively coupled to an adjustment mechanism such as the adjustment assembly 203 and/or to a projection assembly such as the projection assembly 201. In FIG. 4, the cavity 110 includes one or more other components such as a component 206, which can be a connector, and a component 207, which can include a battery, power management circuitry, communication circuitry, audio circuitry, a processor, memory, etc., which can be operatively coupled to one or more other components of the system 100. As an example, the left side 113 of the system 100 can include a slot 119 for receipt of a component or assembly that can be plugged into the component 206 such that the component or assembly can be operatively coupled to one or more other components of the system 100. As an example, the component 206 can be one or more of a power connector and information connector. As an example, the component 206 may be a connector suitable for connecting a computing device (e.g., a notebook computer, a smartphone, a tablet, etc.).

In the example of FIG. 4, the back side 116 can include one or more features such as the feature 117, which may be a mounting feature and/or an interface feature. For example, the system 100 can include a back side interface that can receive one or more conduits (e.g., power, information, etc.), which may be set within a wall to which the system 100 is mounted. When mounted to a wall, the system 100 may provide a clean appearance, for example, a cordless appearance where cords are not utilized or utilized but not visible (e.g., coupled via the back side 116, etc.). As an example, a cord can be a type of conduit.

As an example, the system 100 may be serviceable in one or more manners. As an example, the system 100 can include one or more upgradable components, optionally configured as an assembly that can be swapped in or out via the left side 113, the right side 115, the back side 116, the front side 112, the top side 118 or the bottom side 114 of the system 100. For example, the top side 118 can be removable to access one or more components. Where a system does not include a portion such as the portion 400, the top side can be a continuous top side that extends substantially from a left side to a right side and substantially from a front side to a back side.

As an example, a system may be shaped as a plank that can be defined by a depth (e.g., $\Delta y$), a length (e.g., $\Delta x$) and a thickness (e.g., $\Delta z$) in a Cartesian coordinate system such as the x, y, z coordinate system shown in FIG. 4, which includes an x-axis, a y-axis and z-axis. Various components of a system can be defined at least in part via one or more dimensions, which can include, for example, one or more dimensions referenced with respect to a coordinate system such as the coordinate system shown in FIG. 4. Various systems may be configured as shown in one or more of the environments, where various features of an environment may be referenced as to size, shape, etc., of a system (e.g., consider a chair with a chair height, a door with a standard door height, a countertop with a standard countertop height and/or depth, etc.). As an example, a length may be of the order of several feet (e.g., from approximately 60 cm to approximately 120 cm) and a depth may be of the order of a foot to several feet (e.g., from approximately 30 cm to approximately 80 cm). As an example, a thickness may be of the order of inches, for example, from about three-quarters of an inch to several inches (e.g., from approximately 1.5 cm to 9 cm).

Figure 5:
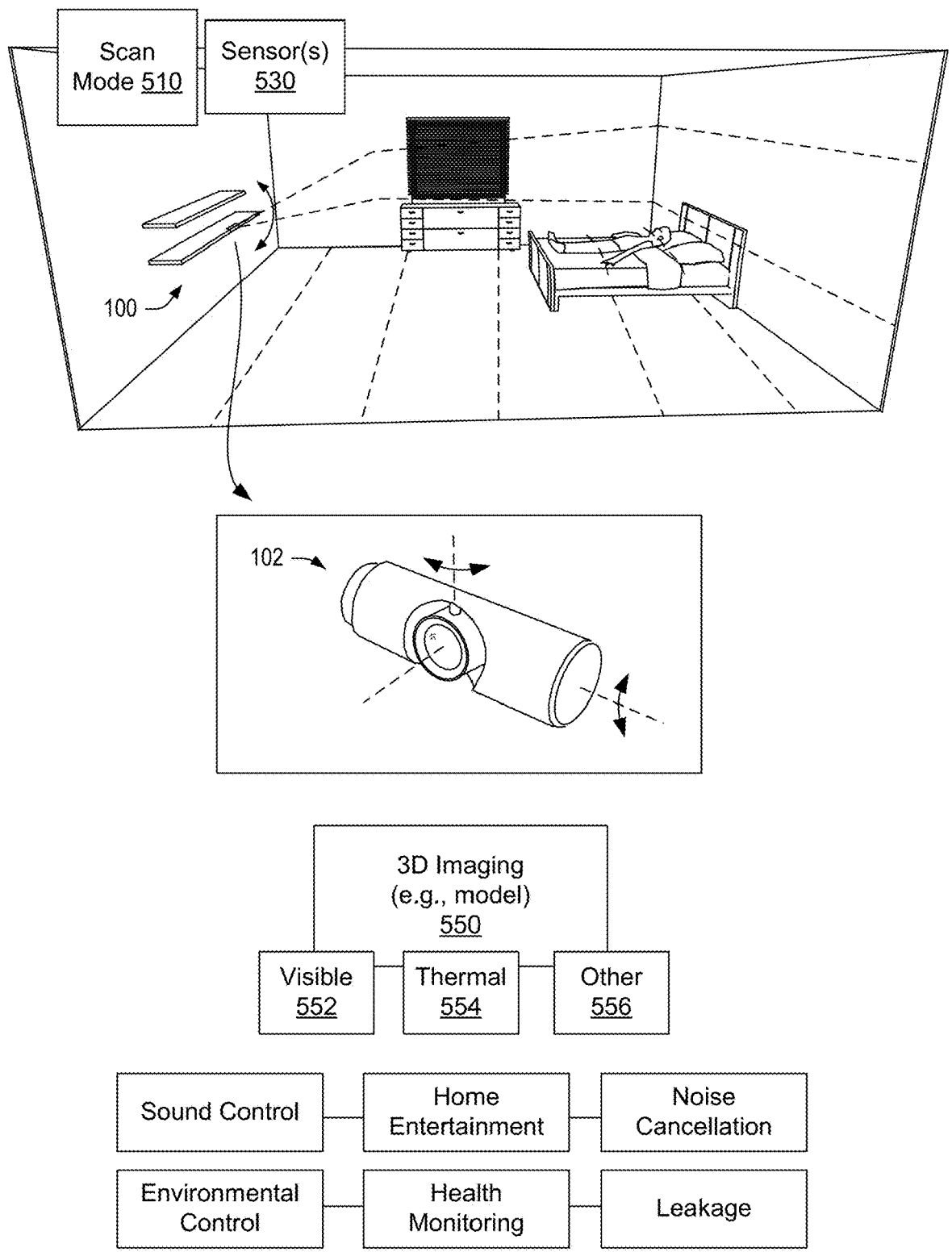
FIG. 5 is a diagram of an example of a system in an example of an environment along with a perspective view of an example of an assembly.

FIG. 5 shows an example of the system 100 configured with a scan mode 510 where one or more sensors 530 can be utilized to scan an environment. As shown, the scan mode 510 can be part of a self-awareness feature of the system 100. As mentioned, the system 100 may be positionable in one or more positions, for example, in a single room or in one of a plurality of different rooms. Via the scan mode 510, the system 100 can become aware of its environment (e.g., an position in the environment) and can adjust itself accordingly, which can optionally allow the system 100 to improve its performance, select one or more modes, select one or more GUIs for set-up options, etc. For example, via the scan mode 510, the system 100 can become aware via scanning of its environment that the environment includes a bed and hence is a bedroom. The system 100 may also become aware of one or more windows, one or more doors, one or more other pieces of furniture, etc. In response, the system 100 can enter a set-up menu for options associated with a bedroom (e.g., sleep time, emergency management, etc.). Similarly, when in a kitchen environment, the system 100 may enter a set-up menu for options associated with a kitchen (e.g., recipes, appliances, etc.). For example, in a kitchen environment, the system 100 may scan and detect via scanning one or more appliances and, for example, positions of such appliances with respect to the system 100. Where one or more appliances include communication circuitry, the system 100 may optionally include circuitry that can scan for communication circuitry, communications, etc. (e.g., BLUETOOTH, WiFi, etc.).

As an example, the system 100 can utilize the one or more sensors 530 in the scan mode 510 to generate 3D imaging information 550, which can include generating a 3D model of the environment (e.g., consider a computer-aided design (CAD) type of model, which can include dimensions, etc.). Such imaging may be visible 552, thermal 554 and/or other 556.

In FIG. 5, an example of an adjustable direction video projector 102 is shown that can include rotatable components, which include rotatable optics. For example, a body can be rotatable along one axis, which may be a longitudinal axis, while another body can be rotatable long another axis, which may be a transverse axis. In such an example, incremental adjustments can be made to the body with respect to the longitudinal axis while scanning (e.g., line, back and forth, z-scan, etc.) can be performed via adjustments to the other body with respect to the transverse axis. As an example, each of the bodies may be rotatable a number of degrees, optionally up to 360 degrees. As mentioned, a sleeve may be utilized to encase one or more components of an adjustable direction video projector such that objects, dust, etc., do not interfere with movements. As mentioned, one or more electric motors may be utilized as part of an adjustment mechanism where circuitry can control at least one electric motor based at least in part on a selected mode of a plurality of modes. As an example, a system can include one or more sensors, optionally as one or more adjustable direction sensors.

As an example, in the multibody example of FIG. 5, rotations along the longitudinal axis may correspond to operational modes that include a floor mode, a wall mode and a ceiling mode. In such an example, the rotations may correspond to a far-wall mode and a near-wall mode. As an example, a near-wall mode can include an "above the plank" mode (e.g., between a ceiling mode and horizontal) and a "below the plank" mode (e.g., between a floor mode and horizontal).

As an example, a projector may project electromagnetic radiation (e.g., IR, visible, etc.) while a sensors senses reflection of the projected electromagnetic radiation by the projector. As an example, a projector can be rated as to wavelength range. As an example, a projector may include multiple illumination sources, which have different wavelength ranges. As an example, an RGB or other color system approach may be utilized where separate illumination sources are provided. As an example, a projector may include an illumination sources that is not in the visible range of wavelengths with respect to the human eye.

As an example, optics may be operable for projection and sensing or may be dedicated to projection or may be dedicated to sensing. As an example, a system can include one or more motion sensors, which can include one or more image based motion sensors. As an example, a system can include an adjustment mechanism for adjusting one or more motion sensors, optionally for sweeping a region for detecting motion, focusing in a region for detecting motion, etc.

As an example, the system 100 can optionally utilize an adjustable projection direction video projector in an operational mode for scanning, in combination with one or more sensors. For example, such a projector can include one or more lasers (e.g., laser circuitry) that can generate lasers scans of the environment where movement of direction of the projector allows for generation of such laser scans. In such an example, the system 100 can include one or more sensors that receive reflected laser energy, which may be utilized, for example, to form a 3D point cloud. The system 100 can include local and/or remote circuitry (e.g., one or more applications, etc.) to construct a 3D model of the environment from the 3D point cloud.

As to thermal imaging, such imaging may utilize infrared sensing. As an example, consider sensing a window and/or cracks and/or joints and/or walls and/or a floor and/or a ceiling through thermal energy. As an example, thermal imaging may be utilized to detect one or more living objects in an environment. For example, consider a person, which may be awake or sleeping. As an example, as to thermal energy sensing, the system 100 can include analysis circuitry (e.g., local and/or remote) that can analyze thermal information, optionally along with one or more other types of information, to determine a state of a living object (e.g., rest, active, exercising, healthy, unhealthy, etc.). As an example, consider a person watch program, a dog watch program, a cat watch program, etc. As an example, an environment can include a bed for a dog where the system 100 can monitor the dog via at least one of the one or more sensors 530. As an example, an environment can include a bed for a human or humans where the system 100 can monitor the human or humans via at least one of the one or more sensors 530. In such examples, the system 100 may issue one or more signals that can notify and/or control. For example, where a human is detected as being "hot" while sleeping, the system 100 may issue an environmental control signal to a heating, ventilation and/or air conditional unit (HVAC) controller to adjust the temperature in the environment (e.g., or air flow, or filtering of air, or humidity, etc.).

As an example, the system 100 may provide for monitoring and/or care of one or more plants. For example, if the system 100 senses a plant wilting, due to heat or lack of humidity, the system 100 may control one or more pieces of equipment to mitigate the wilting of the plant. As an example, the system 100 may be operatively coupled to one or more adjustable windows and/or window treatments, which can be electronic and/or mechanical/electronic. As an example, a window treatment can include adjustable blinds, which may be interior and/or exterior. As an example, a window treatment may be electrical such as via liquid-crystals that can change opacity and/or reflection coefficient of a window (e.g., in total, over an area, etc.).

FIG. 5 shows some examples of sound control and environmental control, which may utilize information acquired via the scan mode 510. For example, consider sound control of a home entertainment system based on a 3D model of an environment, which may aim to optimize sound and avoid deadspots, etc. In such an example, the system 100 can include one or more speakers and/or be operatively coupled to one or more speakers (e.g., via wire and/or wirelessly), which may be located via scanning. As an example, the system 100 may be configured to effectuate noise cancellation via one or more sound wave generators. As an example, the one or more sensors 530 can include one or more microphones where the scan mode 510 can optionally include a sound scan (e.g., sound wave scanning), which may be for purposes of locating objects (e.g., living, fixed, etc.) and/or for locating sounds, which may vary with respect to time (e.g., time of day, etc.). As an example, the system 100 can process such information to determine one or more aspects of the environment, which, as mentioned, may include noise cancellation. As an example, a noise cancellation implementation can include detecting exterior noise and/or interior noise (e.g., HVAC related, etc.) and actuating one or more sound wave generators to help cancel the noise.

As mentioned, the scan mode 510 can be utilized for purposes of environmental control, which can include, for example, health monitoring of an environment and/or one or more living objects. As an example, environmental control can include monitoring an environment for leakage, which may be leakage of air (e.g., into and/or out of) as indicated via sound and/or thermal sensing and/or may be leakage of thermal energy (e.g., into and/or out of) as indicated via thermal sensing. As an example, the system 100 can be operatively coupled to one or more environmental control systems of a structure such as an air handler, a heater, a cooler, a humidifier, etc. In such an example, the system 100 can be aware of its environment via a scan mode 510 to facilitate control of the environment.

Figure 6:
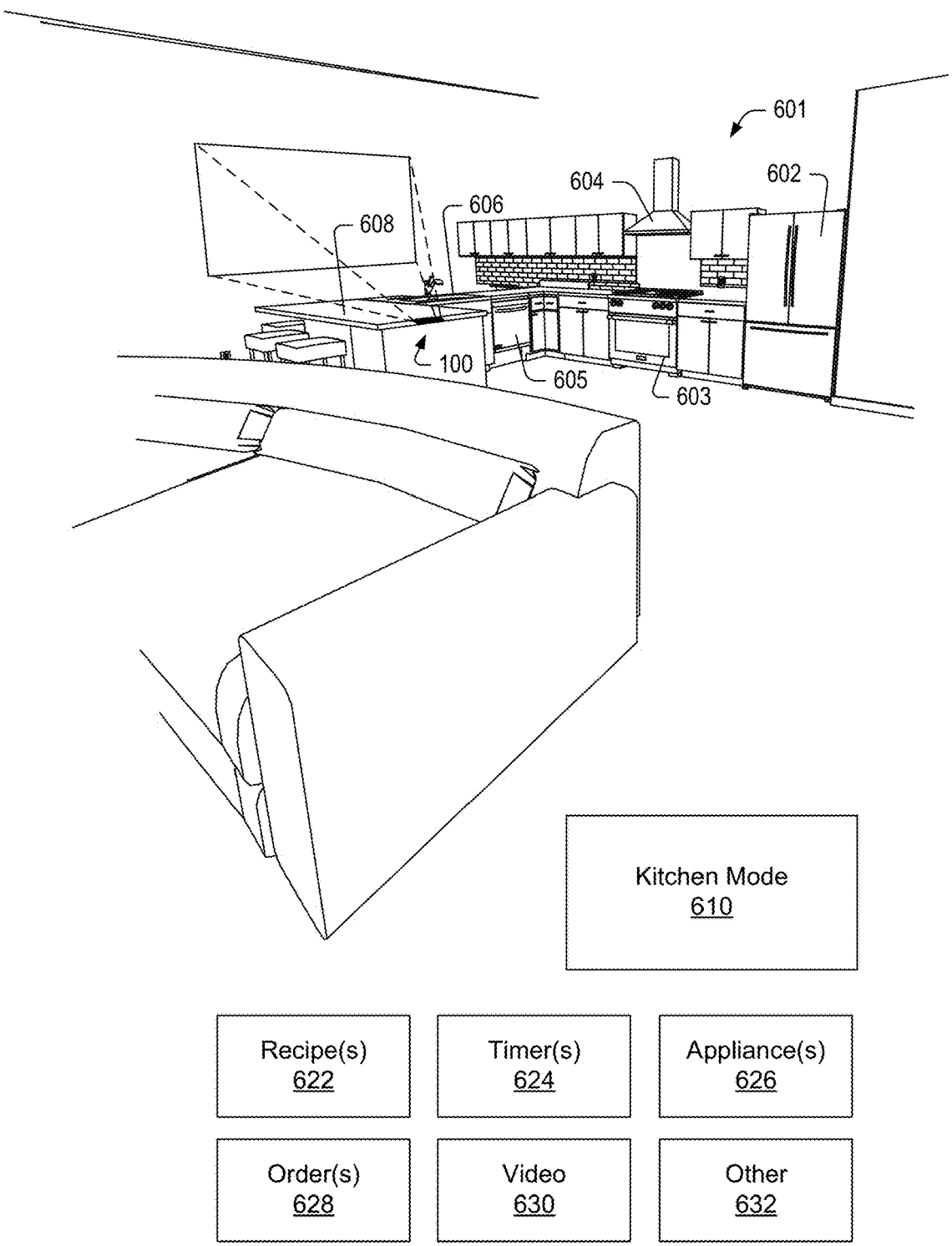
FIG. 6 is a diagram of an example of a system in an example of an environment.

FIG. 6 shows an example of the system 100 in a kitchen environment 601, which may be an open concept environment that is part of a great room. As shown, the kitchen environment 601 includes a refrigerator 602, an oven/stove/range 603, a range hood 604, a dishwasher 605, a sink 606 and various other components. As an example, the environment 601 may include a temperature and/or humidity controlled beverage appliance (e.g., a wine refrigerator, etc.). As mentioned, where the system 100 includes a scan mode, it may scan an environment and optionally detect things that are in the environment (e.g., cabinets, appliances, plants, etc.).

In the example of FIG. 6, the system 100 is shown as being part of a countertop 608 where kitchen cabinets are located underneath a portion of the countertop. In the example of FIG. 6, the system 100 can include a kitchen mode 610, where the kitchen mode 610 can include information as to recipes 622, timers 624, appliances 626, orders of food and/or other items 628, video 630 and optionally one or more other types of items, features, etc.

In the example of FIG. 6, the system 100 is in a wall projection mode of the kitchen mode 610 where, for example, one or more recipes may be projected onto the wall. As an example, the kitchen mode 610 can include another projection mode such as, for example, a floor projection mode, which may help illuminate a floor path to the refrigerator 602 at night. For example, the system 100 can include a motion sensor that can detect motion where if that motion occurs at night, the system 100 can enter a floor projection mode that projects illumination onto the floor of the kitchen at or near the refrigerator 602, for example, to help someone locate the refrigerator 602 in a safe manner for purposes of getting food, a drink, etc., as may be in the refrigerator 602. As an example, the system 100 can include a schedule, which may limit operation of the floor projection mode to particular times (e.g., nighttime only, etc.). In such an example, a mode may be selected based on one or more criteria, which may include, for example, a schedule-based criterion and a sensor-based criterion.

As an example, the system 100 may be operatively coupled to the oven/stove/range 603, which may provide for transmission of information such as temperature versus time, internal elements (e.g., broiler, fans, rotisserie, etc.), water/steam injection, burner settings, emissions, etc. As an example, the system 100 may be operatively coupled to the range hood 604, for example, to receive information and/or to control operation of one or more components, which can include one or more of the range hood 604, the oven/stove/range 603, an HVAC system, etc. As an example, consider an environmentally friendly house that is "tight" where make-up air may be required where the range hood 604 operates above a certain flow rate. In such an example, the system 100 may sense the flow rate and determine that it is above a level and, in response, call for activation of a make-up air system, which may optionally include a heat exchanger to heat and/or cool make-up air as drawn from an outside environment. As an example, the system 100 can project information pertaining to operation of one or more appliances during cooking/food preparation. For example, if grilling gets to smoky, then the system 100 may project a warning stating that an air hazard and/or other hazard exists. The system 100 may project information that can be followed to mitigate the situation (e.g., turn down burner, turn up range hood, turn down temperature in oven, etc.). As such, the system 100 can extend beyond projection of a recipe to projection of information as to environment during execution of a recipe, etc. In the great room environment, such information may help to maintain an ambience such that cooking is enjoyed and/or optimized with minimal impact to the overall environment (e.g., via adequate ventilation, smoke control, etc.).

Figure 7:
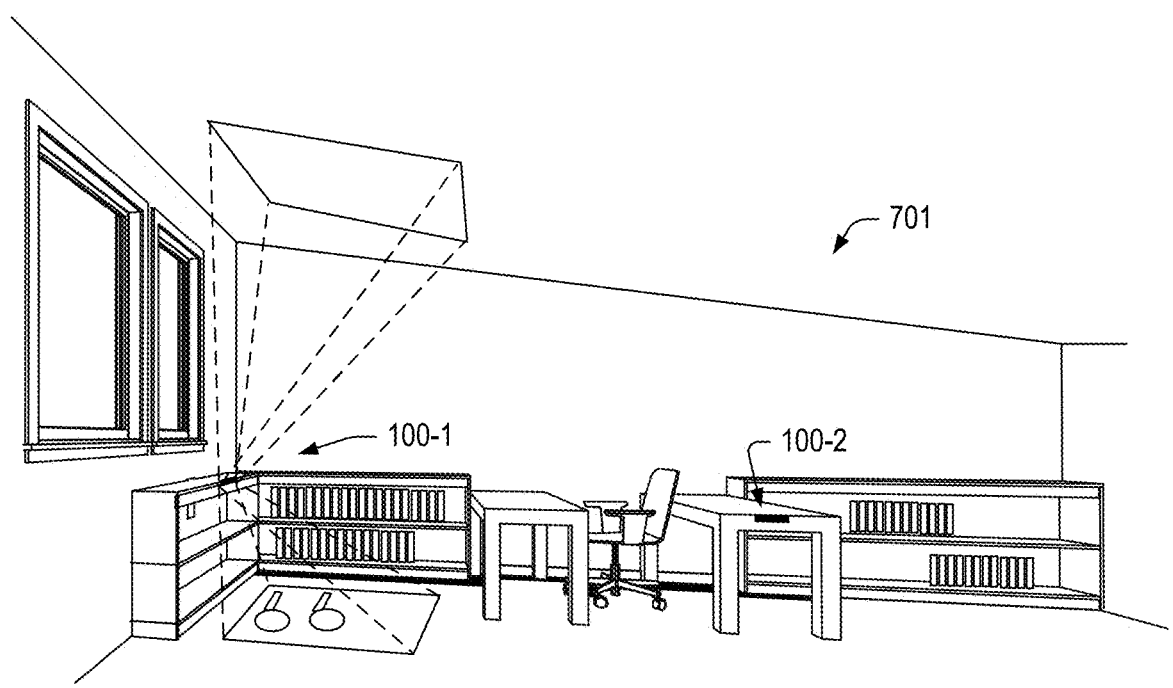
FIG. 7 is a diagram of an example of a system in an example of an environment.

FIG. 7 shows an example of two instances of the system 100 as a system 100-1 and a system 100-2 in an environment 701 that can be an office or library environment. As shown in FIG. 7, the system 100-1 is implemented as a plank of a book case while the system 100-2 is implemented as a plank of a table. The system 100-1 and/or the system 100-2 can include an office or library mode 710. Such a mode can include settings for mood 722, work information or library information 724, shelf organization 726, book/binder content 728, video 730 and/or one or more other features.

As shown in the example of FIG. 7, the system 100-1 can include a floor projection mode and a ceiling projection mode. As an example, the floor projection mode can provide information concerning one or more books, binders, etc., as located on a shelf (e.g., or file cabinet, etc.). As shown, two books are identified as being on a shelf where information can be projected as to the content of such books. The projection onto the floor can help one locate the book or books on the shelf and understand the content thereof. As an example, a mode can include projecting information to locate an object and/or to describe an aspect of the object. For example, consider projecting an indicator to locate a book on a shelf and projecting information that includes the title of the book, a chapter number, a page number, text in the book, etc. In such an example, a user can begin to comprehend context before grabbing the book or, for example, deciding not to grab the book. Such an approach can save a user time when seeking information that can be in a book, a folder, etc.

Figure 8:
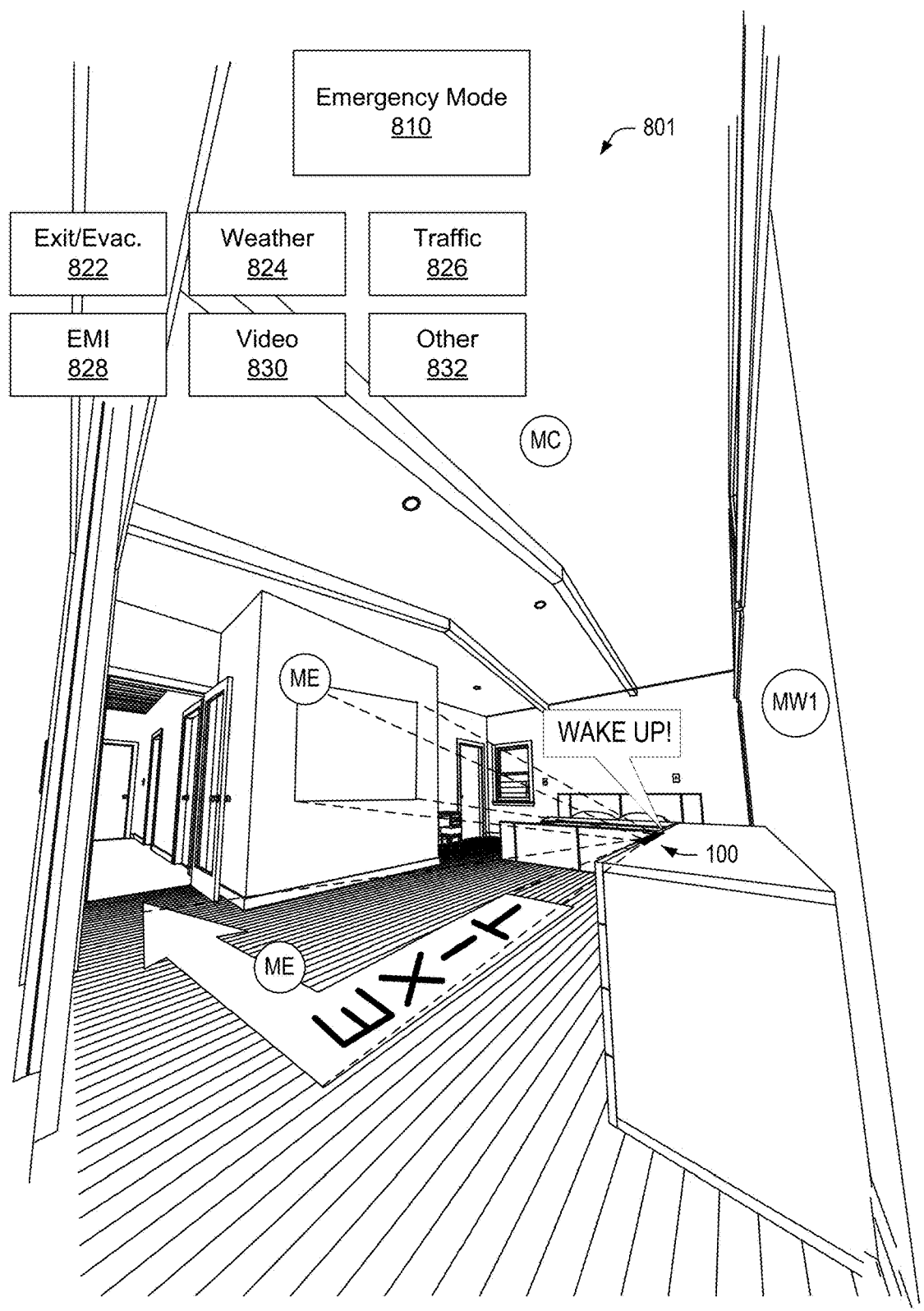
FIG. 8 is a diagram of an example of a system in an example of an environment.

FIG. 8 shows an example of the system 100 in an environment 801, which is shown to be a bedroom environment. In the example of FIG. 8, the system 100 is implemented as part of a dresser that includes drawers for items such as clothing. As shown, various modes exist including a wall mode MW1, a ceiling mode MC, and an emergency mode ME. As shown the system 100 can include an emergency mode 810 that can provide for information such as exit/evacuation 822, weather 824, traffic 826, emergency management information (EMI) 826, video 830 and/or one or more other types of information. As an example, the emergency mode 810 may allow for control of one or more aspects of a structure, for example, one or more utilizes, one or more lights, one or more doors, one or more windows, one or more fire extinguishing systems, one or more pumps, one or more drains, one or more valves, etc.

In the example of FIG. 8, the mode ME can project information to a wall and/or to the floor. As shown, the floor projection is an arrow which may be animated to help a person exit the room in a safe manner depending on the nature of the emergency. As an example, the system 100 can include logic that can determine via one or more sensors where a hazard may exist in a structure to determine the most appropriate exit/evacuation route. For example, a fire in one part of the structure may be sensed via smoke and an exit may be projected to a window rather than a door given the location of the fire in the structure.

Figure 9:
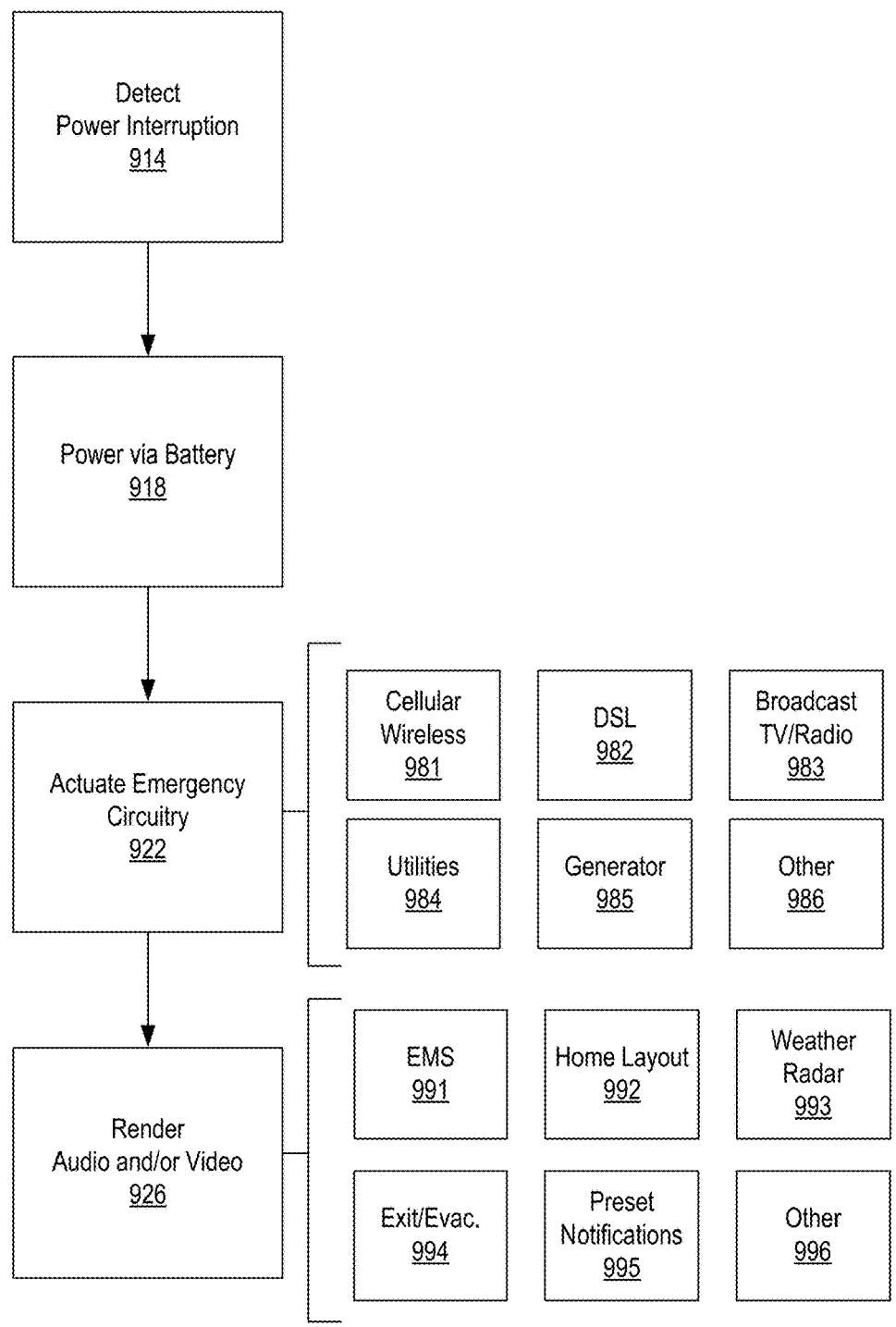
FIG. 9 is a diagram of an example of a method.

FIG. 9 shows an example of a method 910 that includes a detection block 914 for detecting interruption of power by the system 100, a power block 918 for powering the system 100 via battery (e.g., optionally via solar, wind, etc. where available), an actuation block 922 for actuating emergency circuitry of the system 100 or operatively coupled to the system 100, and a render block 926 for rendering audio and/or video based on information received by the system 100 at least in part via the actuated emergency circuitry.

As shown in FIG. 9, the emergency circuitry can include one or more of cellular wireless circuitry 981, DSL circuitry 982, broadcast TV/radio circuitry 983, utility circuitry 984, generator circuitry 985 and/or one or more other types of circuitry 986.

As shown in FIG. 9, the audio and/or video can include information such as emergency system (EMS) information 991, home layout information 992, weather/radar information 993, exit/evacuation information 994, present notifications 995 and/or one or more other types of information 996.

As an example, the system 100 can include a rechargeable battery (e.g., lithium-ion, etc.) that is utilized for powering circuitry such as circuitry of a SIM card that can access a cellular network to receive information and/or circuitry such as a radio, which can include circuitry for receipt of broadcasts such as AM, FM, weather, short-wave, etc. In such scenarios, a user may be informed suitable where the system 100 can project at least a portion of emergency related information to a surface in an environment, for example, as shown in the example of FIG. 8.

Figure 10:
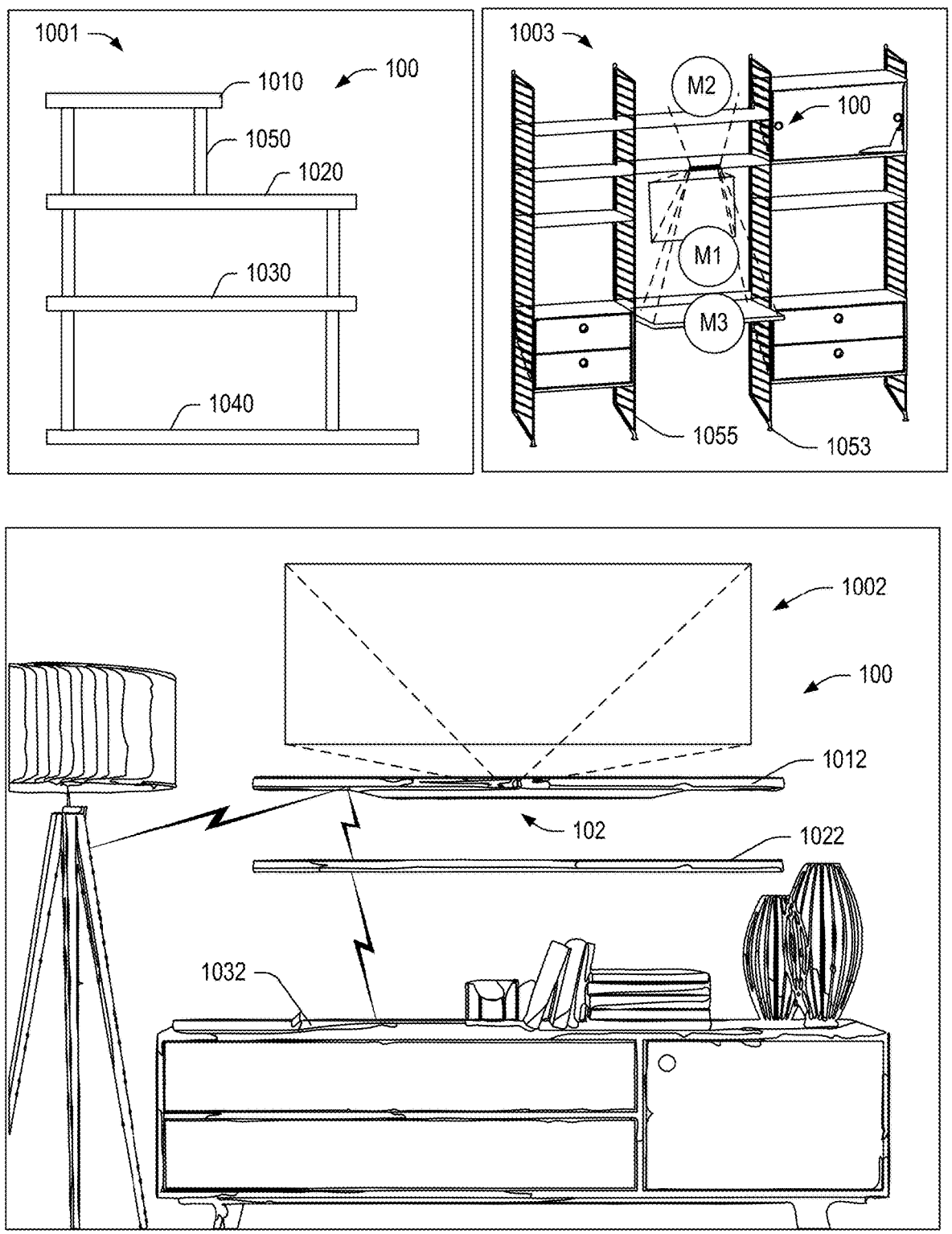
FIG. 10 is a diagram of examples of assemblies.

FIG. 10 shows an example of the system 100 as implemented in an assembly 1001 that includes various planks 1010, 1020, 1030 and 1040 as connected via various uprights 1050, an example of the system 100 as implemented in an assembly 1002 that includes various planks 1012, 1022, and 1032 and an example of the system 100 as implemented in an assembly 1003 that includes various elements supported by a plurality of uprights 1053 and 1055, which may be floor supported, ceiling supported and/or wall supported. As an example, the various planks 1010, 1020, 1030 and 1040 and/or 1012, 1022, and 1032 can include circuitry where at least one of the planks 1010, 1020, 1030 and 1040 and/or 1012, 1022, and 1032 includes an adjustable direction video projector as in the system 100. The system 100 can include wires/connectors that connect the various circuits, optionally via one or more of the uprights. As an example, the upright on the left in the assembly 1001 may be a contiguous upright that include connectors for interconnecting circuitry of the planks 1010, 1020, 1030 and 1040.

As to the assembly 1002, it may include wood and metal components. As an example, the wood may be stained and polished with a high-end finish. As an example, a system can include a chassis, which may be a metal chassis where the metal chassis can be surrounded at least in part with another material such as wood, which may be or include a wood veneer (see, e.g., FIG. 4). As an example, a system may be operatively coupled to one or more electronic items in an environment and/or external to an environment. As to the assembly 1002, it may be configured to control a lamp that is shown to be close by where turning on the lamp may help to illuminate one or more items on a shelf, a plank system, etc. As an example, where projection is desired as to video (e.g., a TV show, a movie, an Internet video, etc.), the assembly 1002 may control the lamp to turn it off or turn it down to make sure that the environment is not too bright, which may allow for better visibility of the projected video and/or conservation of one or more of an illumination source of a system, a battery of a system, power consumption of a system, etc.

As an example, a system such as the system 100 can be a part of a shelving system such as, for example, the STRING® system of String Furniture AB, Malmö, Sweden. FIG. 10 shows the assembly 1003 as including components of the STRING® system where the system 100 can include a plurality of modes M1, M2 and M3, where M1 projects onto a wall, where M2 projects onto a ceiling, and where M3 projects downwardly onto a desktop surface, which if not present (e.g., folded down) may project downwardly onto a floor surface. The assembly 1003 can be a multi-function assembly that can be utilized for entertainment, work, etc. For example, as to work, the mode M1 and/or the mode M3 may be utilized to project work related information (e.g., GUIs, graphics, videos, etc.); as to entertainment, the mode M1 may be utilized to project entertainment content (e.g., videos, etc.), which may be viewed from a distance such as a person sitting on a sofa; and, as to mood or bedtime viewing, the mode M2 may be utilized to project ambient images (e.g., still, video, etc.) onto a ceiling for a person lying on the floor, lying in a bed, reclining in a chair, etc. As shown, the system 100 can be configured to be supported between uprights 1053 and 1055 as part of a shelving/cabinet/desk system that includes various components that can be selected and assembled in one or more configurations. In such an approach, the use, configuration, location, etc., of the system 100 may be according to a user's desire. As an example, an assembly may include one or more instances of the system 100, optionally with one or more of the same and/or one or more different functions, programs, components, etc.

Figure 11:
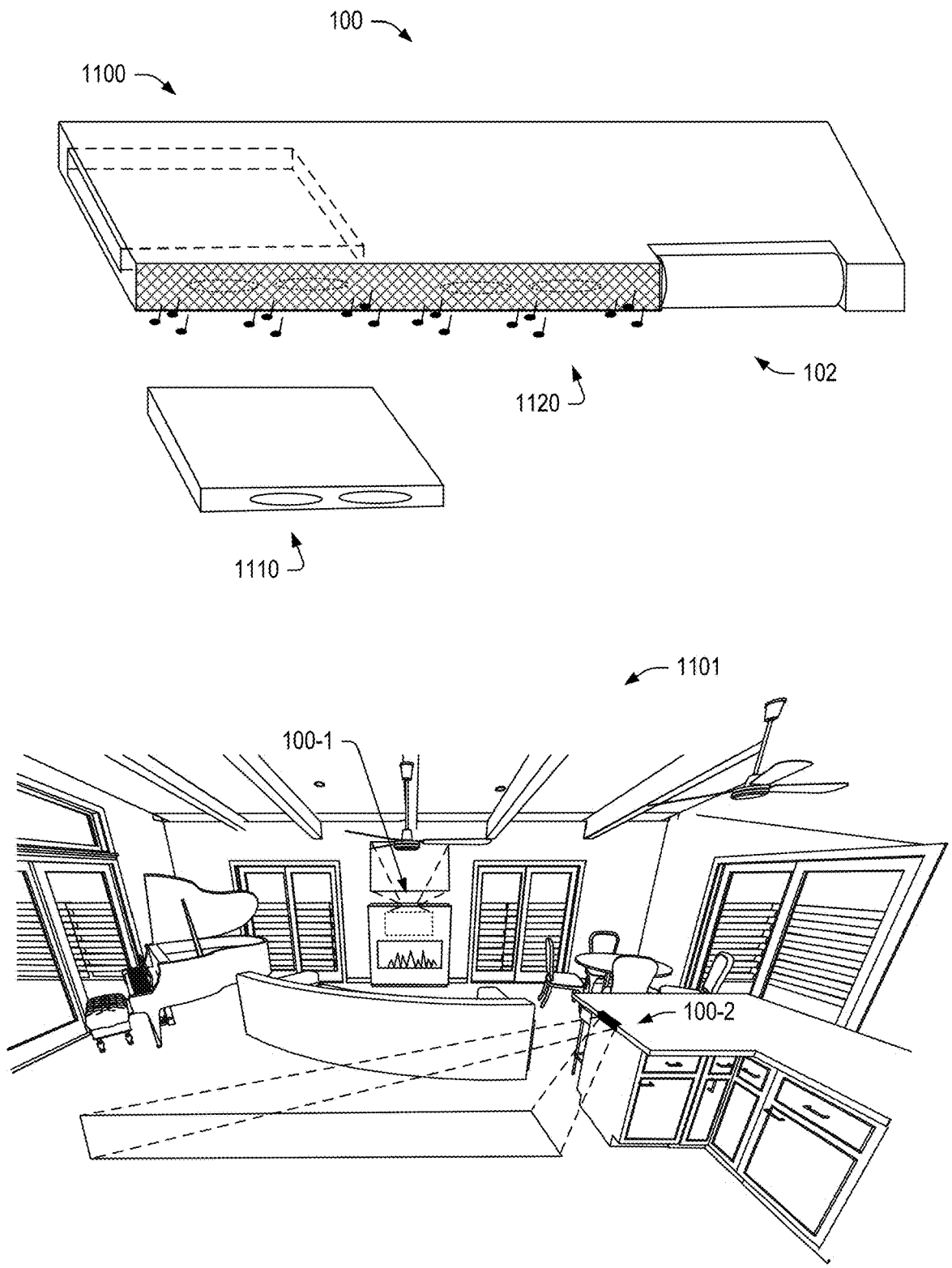
FIG. 11 is a diagram of an example of a system and an example of an environment that includes a plurality of systems.

FIG. 11 shows an example of the system 100 that includes a bay 1100 that can receive a component 1110 as well as an example of a portion 1120 that can include one or more sound speakers (e.g., or one or more speaker vents or openings, a speaker grill, etc.). FIG. 11 also shows an example of a great room environment 1101 that includes two systems 100-1 and 100-2, where the system 100-1 is implemented with respect to a fireplace, for example, as a mantel or a plank top of the fireplace and where the system 100-2 is implemented as a countertop. As shown, the system 100-1 can include one or more projection modes, which can include one or more wall projection modes and optionally a floor projection mode. A wall projection mode can include a back wall projection mode, which may be a short throw projection mode where the throw is less than approximately two feet (e.g., 60 cm) and/or can include a back wall projection mode, which may be an ultra-short throw projection mode where the throw is less than approximately one foot (e.g., 30 cm). For example, where the system 100-1 is included as part of a mantel of a fireplace, the mantel can extend outwardly a distance of approximately one foot and the system 100-1 can project either upwardly to a back wall and/or downwardly to a back wall, which may provide viewers with a more pleasant viewing experience when sitting on the sofa shown as being in front of the fireplace. For example, the downward projection mode to the fireplace wall (front wall above the opening of the fireplace) may be closer to eye level whereas the upwardly projection mode may result in viewing at above eye level, with a slight upward tilt to a person's head. As an example, a system can provide for a back projection mode where, for example, the fireplace wall includes a back projection screen. For example, where the system 100-1 is implemented as a top of a fireplace, it may be aimed directly or indirectly (e.g., via a mirror) at a back projection screen.

As to the system 100-2, it is shown as being in a floor projection mode, noting that the same or similar system is shown in a different mode in the example of FIG. 6 (e.g., a wall mode).

In the example of FIG. 11, the component 1110 can include circuitry, which can be power circuitry (e.g., a battery), processor circuitry, memory circuitry, communication circuitry, display circuitry, audio circuitry, etc. While a single bay is illustrated, the system 100 can include a plurality of bays, which may be utilized to receive one or more components. As an example, the component 1110 can be a remote control. For example, the bay 1100 can be a storage bay for a remote control where the storage bay can include circuitry for charging (e.g., via contact or contactless) of a rechargeable battery of the remote control. For example, a person sitting on the sofa can hold the remote control and control the system 100-1 to project in a desired projection direction (e.g., via mode selection) and can control content rendered by the system 100-1.

As an example, the system 100 can include charging circuitry and a charging surface where a device can be placed on the surface and be charged via the charging circuitry. Such an example may emit one or more electromagnetic fields that can be received by circuitry of a device such that energy can be received and utilized to charge a rechargeable battery of the device.

As an example, the component 1110 can be a wireless speaker that can be utilized in the bay, for example, where sound is projected outwardly via the portion 1120, and that can be utilized out of the bay, for example, where a user can position the wireless speaker as desired. In such an example, the bay may be utilized as a charging bay that can charge the wireless speaker. As an example, a person may be in the kitchen and cooking according to a recipe projected via the system 100-2 to a wall or the floor and have the wireless speaker sitting on the countertop to listen to a show being received by the system 100-1 such that the volume on the system 100-1 need not be turned up so loud. In such an example, the person may select a projection mode of the system 100-1 that projects onto a back wall above the top or mantel of the fireplace, which may be a larger image and higher, which may be at standing eye level for the person in the kitchen and/or approximately sitting eye level for a person sitting in one of the stools at the kitchen countertop/bar top. As an example, the system 100 can include a fixed speaker and a removable speaker. In such an example, a user may remove the removable speaker and place it in a desired location where the removable speaker can optionally be a wireless speaker, which may receive information from the system 100 or from another source.

As an example, the system 100 may include more than one removable speaker, for example, consider stereo or surround speakers that are removable and positionable as desired. In such an example, the system 100 may include an internal, fixed speaker, which may optionally be part of a surround sound sub-system. As an example, a bass speaker may be included in the system 100 with one or more positionable satellite speakers, which are optionally dockable with the system 100 for charging, etc. As an example, docking may occur via positioning a satellite speaker on the system 100 where wired or wireless charging circuitry may charge a battery or batteries of the satellite speaker. As an example, where a user desires leaving a satellite speaker on a top side of the system 100, it may charge automatically such that a user need not be concerned with power running low on the satellite speaker (or satellite speakers). As an example, the component 1110 can be a satellite speaker that can be placed on a top side of the system 100 and charged, for example, via wireless charging circuitry (e.g., inductive charging, etc.).

As shown in the environment 1101, the great room can include a number of windows (e.g., sliding doors, etc.) where the system 100-1 may include an ambient light sensor that can adjust intensity of light being projected depending on ambient light in the great room. As an example, where the system 100-1 is operatively coupled to one or more light control mechanisms associated with the windows, it may adjust one or more of such light control mechanisms to facilitate viewing of one or more projected images. As an example, the system 100-1 and the system 100-2 may be operatively coupled in that communication and/or control may be established therebetween for one or more purposes. As an example, where the system 100-2 includes a speaker, the system 100-1 may broadcast to that speaker as an option, alternatively or additionally to broadcasting to one or more of its own speakers.

As an example, the component 1110 can be an air mover, optionally with an air filter that can be utilized in the bay and/or out of the bay. In such an example, the bay may be utilized as a charging bay that can charge the air filter. As an example, where a smoker is in a room, the smoker may position the air filter next to an ash tray to process smoky air.

As an example, the system 100-1 can include one or more air movers. For example, the system 100-1 can include one or more fans. In such an example, the one or more fans may help to cool the system 100-1 as being in proximity to the fireplace, which may be a gas fireplace, a wood fireplace or an electrical heat generating fire place. As an example, the system 100-1 can include one or more air movers that can help distribute heat energy of the fireplace. For example, a mantel implementation may include fans that can direct rising heat energy in one or more directions to help distribute heat to heat the room. As an example, for a top implementation, a fan may be coupled to a heat exchanger or cavity within a wall space such that heat energy may be extracted more efficiently and distributed in the room. As an example, an air mover may be operable in one or more directions.

Figure 12:
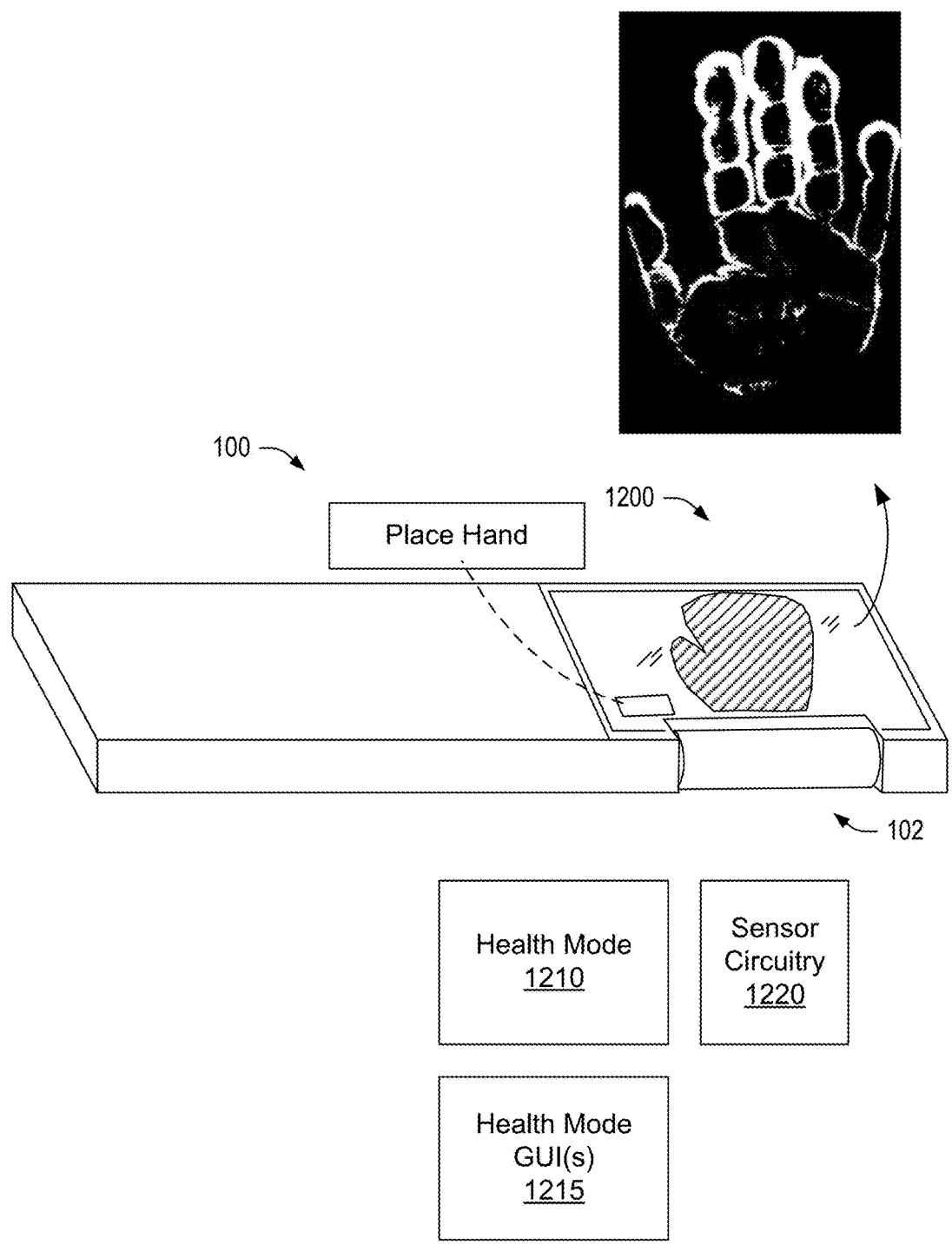
FIG. 12 is a diagram of an example of a system.

FIG. 12 shows an example of the system 100 that includes a portion 1200 that can be utilized in a health mode 1210 of the system 100. As mentioned, a scan mode may allow for health monitoring and/or control with respect to distance-based scanning of feature in an environment. In the example of FIG. 12, the portion 1200 of the system 100 includes contact or proximity sensor circuitry 1220 for sensing input via, for example, placement of a human hand on a surface of the system 100. As an example, the sensor circuitry 1220 may scan for one or more of blood flow, temperature, vibration, electro-magnetic energy, etc. In such an example, a health assessment may be made based at least in part on the sensed information. As an example, the health assessment may be made using local and/or remote circuitry. As shown, the system 100 can include one or more health mode GUIs 1215 that may be renderable to the scanner surface and/or to another surface (e.g., via projection).

FIG. 13 shows an example of an assembly 1300 with one or more processors 1310 being operatively coupled to a digital light processing (DLP) sub-system 1340. The assembly 1300 can include one or more features of one or more DLP chipsets of Texas Instruments, Dallas, Tex. (see, e.g., DLPA059C, January 2015, Revised May 2018, which is incorporated by reference herein). As shown, the DLP sub-system 1340 can be operatively coupled to optics 1360 where the DLP digital micromirror device (DMD) can include millions of micromirrors, which may represent pixels of a display.

The DLP sub-system 1340 can be operatively coupled to one or more illumination sources to create a projected image. For example, consider one or more of including lamps, LEDs, lasers, and laser phosphors. As an example, the DMD can steer a wide range of light wavelengths including visible, infrared, and ultraviolet wavelengths.

FIG. 14 shows an example of projection circuitry 1470, for example, to project information optionally via optics (e.g., an optical module 1407, etc.). As an example, a digital light processing-based (DLP) technique may implement one or more technologies such as, for example, one or more DLP chips, which may be, for example, lamp-based, laser-based, LED-based, etc. As an example, the circuitry 1470 can include one or more features of the assembly 1300 of FIG. 13. As an example, the system 100 can include one or more features of the projection circuitry 1470 of FIG. 14 and/or one or more features of the assembly 1300 of FIG. 13.

As an example, a DLP-based image projection technique may include generating an image via a matrix of mirrors (e.g., consider a semiconductor device such as a digital micromirror device (DMD)). In such an example, individual mirrors may represent one or more pixels for an image (e.g., a projected image). As an example, a number of mirrors may define image resolution. As an example, a matrix of mirrors may be controlled by repositioning to reflect light (e.g., through a lens or onto a heat sink or "light dump"). In such an example, toggling mirrors between orientations (e.g., akin to on and off states) may provide for image characteristics (e.g., image grayscales, etc.).

In FIG. 14, the circuitry 1470 includes a controller 1472 that is operatively coupled to a digital micromirror device (DMD) 1474 that can direct light via projection optics 1484 (e.g., as part of an optical module, shown as including red, R, blue, B, and green, G, drivers). In FIG. 14, the projection optics 1484 may be stationary and/or adjustable.

As an example, the controller 1472 may transmit control information, data, etc., to the DMD 1474. The controller 1472 may also control one or more LED drivers (e.g., for LED emitters) 1481, for example, using a pulse-width modulation (PWM) technique. As an example, the controller 1472 may receive information from one or more sensors 1482. In such an example, a control loop may be established where a portion of emitted light is sensed via the one or more sensors 1482 and used in a control algorithm to control signals to the one or more LED drivers 1481 (e.g., that drive LED emitters). As shown, the DMD 1474 may be operatively coupled to receive light via source side optics 1483 and to project light via projection side optics 1484. As an example, the system 100 may include the circuitry 1470.

As shown in FIG. 14, the circuitry 1470 may include various other components such as, for example, an optional field-programmable gate array (FPGA) 1485, one or more serial PROMs 1486-1 and 1486-2, DDR RAM 1487, an oscillator (OSC) 1488, and a voltage supply 1489. As an example, the controller 1474 may include one or more interfaces. For example, the controller 1474 may include one or more interfaces that may include, for example, an I²C interface (e.g., I2C).

As an example, the controller 1474 may be operatively coupled to a processor of an assembly (e.g., via one or more interfaces). As an example, a processor, a controller, etc. may be configured to control a projector that can project an image onto a surface, for example, where the image may be adjusted based at least in part on characteristics of the surface, a point of view with respect to the surface, etc. As an example, keystoning may be utilized. For example, where a system is self-aware of an environment, the system may understand a position of a surface in space (e.g., via a 3D model) to allow for keystoning of an image such that the projected image appears without distortion or with minimal distortion.

As an example, a processor, a controller, etc. may be configured to determine one or more characteristics of a surface (e.g., based on received information); to determine a point of view for an object with respect to the surface (e.g., based on received information); and to project an adjusted image onto the surface, for example, where the adjusted image is adjusted based at least in part on the characteristics of the surface and the point of view for the object with respect to the surface.

As an example, a system may include adjustable optics that provide for "near-screen" projection and for "far-screen" projection. For example, in a back-projection state, adjustable optics may provide for near-screen projection.

As an example, an optics module may provide for focusing near and for focusing far. As an example, auto-focus circuitry may be included and/or keystone adjustment circuitry.

As an example, a system can include components for one or more types of multi-dimensional effects such as a "3D" effect, which may be via projection of dual 2D images. For example, a system may include two adjustable direction video projectors that are coordinated to project images that create a 3D effect. As an example, an environment may include two systems where the systems may be coordinated in a manner to produce a visual 3D effect. As an example, a system can include 3D viewer technology, which may be active and/or passive. As to active, a viewer can include electronics which interact with projection; while, as to passive, a viewer can filter streams of binocular input to the appropriate eye. As an example, a system may emit a signal that is received by eyewear that can coordinate actions of the eyewear and projections to create a 3D type of experience for a user.

FIG. 15 shows various components of an example of an adjustment assembly 1500. As shown, the adjustment assembly 1500 includes an electric motor that can includes cables and can include one or more of drive electronics 1510, encoders 1520, and gearheads and/or lead screws 1530. The electric motor can be a stepper motor that includes a number of steps per revolution of the shaft of the electric motor. As mentioned, gears, etc., may be utilized to adjust output, for example, as a transmission. As an example, the electric motor can be a multi-phase as to control for clockwise and counter-clockwise rotation. For example, consider phases A and B where a combination of plus and minus of each phase provides for four states (e.g., ++−+, −−, +−). As an example, the adjustment assembly 1500 can include one or more features of assemblies available from Dr. Fritz Faulhaber GmbH & Co. KG (Germany). For example, consider a stepper motor model FDM0620-ww-ee with PRECIstep® technology, which is a two-phase stepper motor with 20 steps per revolution. Such a motor has a mass of approximately 1.1 grams and an outer diameter of approximately 6 mm with a length of approximately 15 mm, including shaft, which may be fit with one or more components such as a gearhead, a lead screw, etc. As explained with respect to the assembly 203 of FIG. 2, an electric motor can be utilized as part of an adjustment mechanism to adjust an adjustable direction video projector. A suitably sized electric motor may be selected based on one or more of load, mass, torque, size, power consumption, etc. As an example, a system can include one or more electric motors. As an example, a system can include a multi-axis gimbal or gimbal-like system that includes electric motors, which may be utilized to control projection direction and/or stability of projected information (e.g., graphics, text, video, etc.).

FIG. 16 shows an example of a system 1600 that is configured as a table lamp. In the example of FIG. 16, the system 1600 is shown as being in an environment 1601 where, for example, the system 1600 can include one or more microphones that can receive voice signals such as "Mode 2" (e.g., M2) to cause the system 1600 to select a particular operational mode from a plurality of operational modes.

In a lamp configuration, the system 1600 can include a shade 1670, a stem 1680 and a base 1690. As shown, the stem 1680 can include one or more features 1685 such as a speaker or speakers that can optionally be utilized for rendering audio that accompanies video.

In the example of FIG. 16, the system 1600 includes a plurality of modes such as, for example, a table top mode M1, a shade mode M2 (e.g., a lampshade mode), and a ceiling mode M3. As to the table top mode M1, it may be via a mirror or mirrors such as an annular mirror 1615, which may be angled. As shown, the adjustable direction video projector 1610 may aim at the annular mirror 1615, as supported by one or more supports 1617 where video is reflected downwardly. In such a mode of operation, the adjustable direction video projector can account for the reflection by adjusting video accordingly (e.g., to account for distortion, flips, etc., due to the mirror reflection). As an example, a system may include multiple mirrors, optionally at different levels and/or different angles. As shown, the shade 1615 may be supported by supports 1619 that are coupled to the mirror 1615. As to the base 1690, it may include one or more types of circuitry and, for example, a battery or batteries and optionally touch sensitivity circuitry. As an example, the base 1690 may include a graphical user interface (GUI) that can allow for programming, etc., of the system 1600. As an example, instructional information may be rendered in one or more modes that can facilitate programming. For example, consider the table top mode M1 rendering instructions for use with the GUI.

As to the ceiling mode M3, the adjustable direction video projector 1610 may be aimed via the adjustment mechanism 1630 upwardly through a top opening of the shade 1670, which may be a center opening of the mirror 1615. As to the shade mode M2, the adjustable direction video projector 1610 may be aimed via the adjustment mechanism 1630 radially outwardly toward the inner surface of the shade 1670 in a back projection manner. As mentioned, a mode may be accompanied by instructions that pertain to maintaining an image (e.g., orientation, etc.) with respect to a viewer's perspective (e.g., such that text is not displayed backwards, etc.).

As shown, the system 1600 can include the adjustable direction video projector 1610 and the adjustment mechanism 1630 that is operatively coupled to the adjustable direction video projector 1610, which may allow for adjustments in direction. For example, the adjustment mechanism 1630 can be configured as a gimbal-like mechanism, which may optionally function as a gimbal (e.g., a single or multi-axis gimbal). As mentioned, a system may be suitable for use in a moving vehicle such as a car, an RV, a van, a boat, a ship, a plane, etc. As an example, the system 1600 may be powerable via a battery, which can be an internal battery. In such an example, the system 1600 may be transportable and positionable for use in one or more environments. As an example, the system 1600 may include circuitry that allows for some amount of self-awareness of the system 1600 with respect to its environment. For example, consider GPS circuitry such that the system 1600 can determine movement and/or location. As another example, additionally or alternatively, the system 1600 can include one or more accelerometers and/or one or more gyroscopes. As mentioned, a system can include a scan mode that allows for scanning (e.g., with or without a shade 1670 as shown in the example of FIG. 16). For example, consider scanning the interior of a galley of a ship, the interior of a bridge of a ship, etc.

FIG. 16 shows an example of the adjustment mechanism 1630 being in the form of a gimbal where a stem portion 1631 supports three electric motors 1632, 1634 and 1636, which can be for roll, pitch and yaw or pan, roll and tilt.

As explained, the system 1600 can include the adjustable direction video projector 1610, which may be configured in one or more manners with respect to an adjustment mechanism or mechanisms. As mentioned, a projection mode can be a lamp shade projection mode (e.g., M2). Such a projection mode can be in addition to one or more other modes such as, for example, a ceiling projection mode (e.g., M3) and a downward projection mode (e.g., M1, to a floor and/or a table top). As an example, a mode can include rendering of information via the adjustable direction video projector 1610 where such information may include one or more of weather graphics, weather photos, weather video, medical information, calendar/diary information, Internet website information, time information, etc.

As an example, the adjustable direction video projector 1610 may be configured to project downwardly generally in a direction toward the base 1690 without use of the mirror 1615. For example, consider the stem 1680 being sized as the stem portion of the adjustment mechanism 1631 such that the adjustable direction video projector 1610 can be aimed downwardly without interference from the stem 1680.

In FIG. 16, the stem 1680 and/or the stem portion 1631 can include circuitry that can coordinate actions as to adjustments and modes. For example, such circuitry can provide for mode selection and adjustment based at least in part on mode selection. As an example, the system 1600 can include a lamp mode that is an ordinary illumination mode, which may utilize a projector illumination source or another illumination source, for example, to conserve longevity of the projector illumination source or sources. As an example, a person may utter a command where the system 1600 is in a listening mode that can sense the command via a microphone. In response, the system 1600 can select a mode and adjust a direction of the adjustable direction video projector 1610 as associated with that mode (see, e.g., M1, M2 and M3). As an example, a command such as "lamp" may be uttered to return to a lamp mode and a command such as "lamp off" may be uttered to turn off the system 1600, which may enter a listening mode.

FIG. 17 shows an example of a system 1700 that is configured as a surface mounted system as shown implemented in an environment 1701 and in an environment 1702. As shown, the system 1700 can include an adjustable direction video projector. As shown, the system 1700 can include various projection modes. In the environment 1701, the system 1700 is projecting weather graphics that include weather conditions while in the environment 1702, the system 1700 is projecting in one or more modes, which can include one or more wall modes and/or one or more horizontal surface modes (e.g., table top, desktop, countertop, floor, etc.). As an example, the system 1700 can include an alarm schedule where in the bedroom environment 1701, the wake-up alarm can be a mode selection for a weather mode that projects weather information to a wall, a ceiling and/or a horizontal surface (e.g., night stand top, floor, etc.).

In the environment 1702, the system 1700 can include a rotatable and/or pivoting projector inside which can move to aim at a wall, a ceiling, etc. As an example, the system 1700 can include an adjustment mechanism that includes one or more electric motors that can adjust a projection direction of an adjustable direction video projector and optionally a battery that can power the adjustment mechanism and the projector, as well as other circuitry (e.g., wired and/or wireless communication circuitry, etc.).

As an example, the system 1700 can include a base that is substantially planar and rotatable a number of degrees about an axis normal to the base (e.g., 360 degrees) and include a pivot joint that can pivot a projection component (or components) a number of degrees in a plane that is orthogonal to the base (e.g., 180 degrees or more). As an example, a mode can have an associated direction that corresponds to a surface in an environment that can be "projected onto". In such an example, upon selection of the mode, the system 1700 can respond by adjusting direction to project onto the associated surface. As an example, a wall in the environment 1702 may be defined by an overall surface where a mode for a portion of that surface can differ from a mode for another portion of that surface. In such an example, the two modes are associated with two different projection directions.

As an example, the system 1700 can include a mount that provides for mounting the system 1700 to a surface such as, for example, a ceiling (e.g., via a suitable adhesive, suction mount, a screw or screws, etc.). In such an example, the system 1700 may include a battery and wireless communication circuitry such that a ceiling socket/plug is not required for receipt of power and/or information. As an example, the system 1700 can include a low power mode, which may be utilized when mounted to a ceiling, whereby a portion of the system 1700 is lowered from the ceiling for purposes of power supply replacement and/or recharging. For example, the system 1700 can include a retractable cord and/or battery.

As an example, the system 1700 can include multiple rechargeable batteries, which may operate as a primary system and a back-up system. For example, when a primary system is low on power, the system 1700 can switch to the back-up system and lower a battery carrier with the primary system battery or batteries such that a user may either replace or recharge the primary system battery or batteries. In such an example, the system 1700 can automatically or upon command lift the battery carrier to position it accordingly in the ceiling mounted system 1700 and, as appropriate, switch from the back-up system to the primary system.

FIG. 17 shows an example of a battery carrier 1709 in a lowered state. As an example, the system 1700 may include a coupling (a coupling component or assembly) that selectably couples to a spindle or a spool that is rotatable by a motor of the system 1700 where the spindle or the spool is for a cable that is coupled to the battery carrier 1709. In such an example, where the coupling engages the spindle or the spool to the motor, the motor can be utilized to lower or raise the battery carrier 1709. As an example, the motor can be a motor that is utilized to rotate a projection direction about an axis that is normal to a planar base of the system 1700. For example, the motor can be an electric motor that is powerable by one or more batteries for adjusting a projection direction (e.g., 360 degrees) and for lowering and raising a battery carrier 1709 as coupled to a cable that is coupled to a spindle or a spool. For example, to lower the battery carrier 1709, the spindle or the spool may be rotated clockwise (or counter-clockwise) and to raise the battery carrier 1709, the spindle or the spool may be rotated counter-clockwise (or clockwise). While an example can include primary and back-up power supplies, a system may include a single power supply where, for example, a cable for a battery carrier such as the battery carrier 1709 is an electrical power cable. In such an example, a motor that raises and lowers the battery carrier 1709 via the cable can be powered by a battery or batteries in the battery carrier 1709 via the cable.

As mentioned, a system can include a multi-use electric motor that can adjust a projection direction and that can facilitate battery replacement and/or recharging. In such an example, the system may be a "self-contained" system such that it can be positioned in an environment without regard to outlet/plug locations in that environment. For example, such a system may be mounted in a desired location on a ceiling, or optionally another location such as on a table, a desk, etc. (see, e.g., the environment 1701).

As an example, a system can include a projector lens that rotates on a horizontal axis from a controller wirelessly, from a controller via wire and/or in another manner (e.g., manually). As an example, a system can include a projector lens that rotates on a vertical axis automatically responsive to information sensed by a motion sensor. For example, a person may awake and arise from a bed, be sensed via a motion sensor and then a projector via an adjustment mechanism may project light that follows and/or precedes the person where the adjustment mechanism may adjust one or more lenses with respect to one or more axes.

As an example, a system can include an adjustable direction video projector that is set symmetrically or set asymmetrically along a lengthwise span of a plank, which may be a shelf, a furniture top, a countertop, a positionable plank, etc. As an example, a system can be of a form factor, material and finish of a premium hardwood shelf. As an example, a system can be designed according to one or more Color, Materials, Finish (CMF) specifications (e.g., industrial design focused on the chromatic, tactile and decorative identity of products and environments). As an example, a plank system may be made at least in part of maple, walnut, cherry, oak or another wood. As an example, a plank system can include one or more leather surfaces. For example, consider a top side surface that includes leather, which may be inset.

As an example, a plank system can be a floating plank system where it is mounted with mounting hardware to give a floating appearance. For example, consider mounting brackets made three-sixteenth CNC cut steel backs and three-quarter inch solid steel rods of suitable dimension (e.g., depthwise). As an example, a system can include sockets that can receive such steel rods where the steel rods can be secured, for example, via bolts, which may be hand adjustable (e.g., tool-less) or may be tool adjustable. As an example, the system 100 of FIG. 4 can include one or more sockets that are integrated into the frame 111 such that the frame 111 can support the system 100 in a wall mounted implementation via receipt of rods of a floating mount. While various dimensions and materials, and manners of fabrication, are mentioned, a mount may be of one or more other shapes, dimensions, materials, etc. For example, consider an L shaped wall mount or, for example, the brackets or rails as in the system 100 of the environment 1003 of FIG. 10. In FIG. 10, one or more of the environments 102 and 103 can include mounting hardware for a system or systems such as the system 100. As an example, mounting hardware can be rated such as, for example, rated to withstand a load of more than a kilogram (e.g., from a kilogram to one hundred kilograms). As an example, where a plank system is to be utilized as a shelf for one or more objects, the mounting hardware and mounting method may be chosen to withstand an expected load, for example, with an appropriate safety margin. As an example, a system can include mounting hardware for drywall, for studs, for concrete, for cinder block, for plaster, etc.

As an example, a system can include an articulating multi-purpose projector. As an example, a system can include a projector lens that includes at least two axis of rotation, which can support various modes, which can correspond to one or more purposes (e.g., uses, scenarios, etc.).

As an example, a mode can be for projection of weather/traffic, calendar or TV or movies on a wall. As an example, another mode can be for projection of effects, TV or movies on a ceiling. As an example, yet another mode can be for projection of a spot or ambient lighting on the floor as a night light.

As an example, a plank system can include a slot to add a removable "Tiny" personal computer that may be programmable for one or more general computing purposes and/or one or more specialized purposes (e.g., sensing, scanning, emergency, alarms, security, healthcare monitoring, etc.). As an example, a plank system can include an internal location for a smart assistant, which may be programmed to operate at least in part as a remote control for the plank system (e.g., for mode selection, etc.).

As an example, a plank system can include a single projector that provides multiple useful experiences via multiple operational modes where such modes can include corresponding directions where an adjustment mechanism, which may include one or more electric motor, can automatically adjust a projection direction of the single projector to project at least video in one of the operational modes. In such an example, the video may be streaming video and/or video stored in a medium or media (e.g., a DVD, a hard drive, a solid-state drive, a memory card, etc.).

As mentioned, a plank system can be configured in a manner such that it is customizable to coordinate with one or more other pieces of furniture, hardware, flooring, etc.

The system 100 can be configured and/or adapted to meet one or more trends in interior design (e.g., interior décor). Such a system may be adapted on a room by room basis, for example, as a positionable component and/or as a functional component that has the function of a shelf, a furniture top, etc., which may be used for supporting one or more objects.

The system 100 can be part of a clutter-less, less is more design philosophy, as the system 100 can be unobtrusive and at least to some extent camouflaged and/or hidden. The system 100 can blend in seamlessly into an environment while providing functions of less so discrete equipment such as a large screen television.

As an example, modes can be associated with content. For example, a wall mode or a ceiling mode may be associated with video content as may be available via a streaming service (e.g., cable, dish, etc.). As an example, a mode can be a visual effect or a "mood" mode (e.g., calming scenes, etc.). As an example, a mode can be associated with safety, for example, to help prevent trips, falling, etc., through illumination of a floor.

As an example, the system 100 can be a plank that is a premium shelf or other furniture top. As an example, where implemented as a countertop, the system 100 can include access to one or more components via a drawer or cabinet. For example, a module may drop down into a drawer or cabinet for purposes of access to program, settings, connections, upgrade, repair, etc. For example, consider a stone countertop (e.g., granite, quartz, stone, cement, etc.), where a notch is cut to provide for a projection assembly and where associated equipment may be below the top and operatively coupled to the projection assembly (e.g., for adjustment, etc.).

As mentioned, the system 100 can include one or more speakers such that audio may be rendered, optionally with video. As an example, a speaker may be utilized as an alarm, depending on one or more detected conditions (e.g., smoke, carbon monoxide, water leakage, break-in, pet condition/location, etc.). As an example, a system 100 can include one or more human monitoring features, which may provide for monitoring young (e.g., baby), elderly, other, etc.

As an example, the system 100 can include a tracking feature that utilizes one or more sensors to track an object. For example, consider one or more cameras and/or motion sensors that can track the position of a person walking such that floor illumination may precede the person's likely path to help guide the person. As an example, consider a method that includes a nighttime motion sensing mode that senses when a person is standing in a room and that, in response, directs an adjustable direction video projector to illuminate a floor in a region proximate to the person. As the person starts to walk, the direction can be adjusted for the illumination to be in advance of a likely path, which may be learned through prior motion sensing, predicted via self-aware 3D modeling of features of an environment (e.g., bed and door or doors), and/or programmed by an individual. Such an approach can help to illuminate the floor such that the person can avoid objects and safely reach a destination. The intensity of the illumination may be adjustable. As an example, illumination may avoid blue light or have a low amount of blue light as blue light can be disturbing to sleep. As an example, intensity may be adjusted to be low where multiple people are sleeping in the same environment such that the illumination is less likely to disturb sleep of one or more other people.

As an example, where multiple systems are employed in a structure, a daisy chain mode may be implemented. For example, where a person begins a journey from a bedroom to a kitchen, the system in the bedroom may alert the system in the kitchen to enter a mode that expects the person such that appropriate floor illumination may be staged and commenced once motion is detected or expected. As an example, consider a sequence of bedroom activation and projection, kitchen alert, kitchen projection, bedroom deactivation, bedroom alert, kitchen deactivation/bedroom activation, bedroom deactivation, and logging of the sequence of events to memory, which may provide for interrogation and/or assessment at a later time (e.g., for health or other reason).

As an example, a system may have one or more assemblies that are adjustable by hand. For example, consider an adjustable coupling (e.g., an articulating arm, etc.) that allows for rotation of an assembly, which may be from a position that is along the length of a plank to a position that is substantially normal to a surface of the plank (e.g., sticking up at 90 degrees or sticking out at 90 degrees or sticking down at 90 degrees). Such an approach may allow for projection onto one or more surfaces that otherwise may not be accessible for projection in the native state. As an example, in an adjustable coupling approach, the system may decouple from an adjustment mechanism of an adjustment assembly. For example, a system can include an automatically adjustable state and a manually adjustable state, where manual adjustment does not affect an adjustment mechanism, which may be a relatively finely tuned mechanism that is to be free from manual manipulation. As mentioned, a sleeve may be utilized to contain one or more movable components of a system. Such a sleeve may help to prevent undesirable manual movement of one or more components of a system. As an example, in a non-native state, a sleeve may be present and available as a contact surface for moving a portion of a system. A sleeve may be cleanable via one or more fluids, etc., which may be non-damaging to one or more materials/finishes of the system. As an example, a non-native state may facilitate cleaning and/or maintenance of one or more components of a system.

As an example, a self-aware system may uncover one or more surfaces that may be available in a non-native (e.g., housed) state of a system. In such an example, the system may generate one or more non-native modes where information may be projected to notify a user of such one or more non-native modes. As an example, a system can include one or more features that can detect when an assembly is in a non-native state and, in response, enter into a corresponding non-native mode. For example, in the environment 101, the system 100, if self-aware, may discover the wall with the window and generate a non-native mode for a projection assembly of the system 100 where the projection assembly is rotated outwardly from its housed, native state such that a projection direction can be toward the wall with the window. In such an example, upon use of the projection assembly in that non-native state, the system 100 may project or otherwise issue a notification to return the projection assembly to its native state to help avoid damage to the projection assembly. In its native state, the projection assembly may be relatively indiscreet such that an individual that is unaware of the system 100 does not even notice it as being such a multi-functional system; rather, the individual may simply see a relatively aesthetically pleasing shelf.

As an example, a projection assembly can include a gimbal, such as a gimbal of a video camera utilized for filming video as in a drone, a handheld system, etc. As an example, a system can include a gimbal that may be motorized such that directional control of a projector is available for the system.

As an example, a system can include an articulating lens barrel for variable vertical travel and a rotatable lens socket for lateral travel.

As an example, a system can be part of a freestanding piece of furniture. For example, consider the table example of FIG. 7.

As mentioned, a system can be part of a larger system, which may be interoperable. For example, consider use of uprights to connect systems and/or edges of planks to connect systems. As an example, a plank can include connectors that are at its edges that allow for connecting planks. In such an example, the planks can include a removable trim piece that is a cover for one or more connectors.

As an example, a system can include a plank that includes an adjustable direction video projector; and circuitry operatively coupled to the adjustable direction video projector that selects one of a plurality of operational modes of the adjustable direction video projector and that adjusts a projection direction of the adjustable direction video projector responsive to selection of the one of the plurality of operational modes.

As an example, a system can be a shelf plank. As an example, a system can be a furniture plank, for example, consider a horizontal plank of at least one of a cabinet and a table. As an example, a system can be a countertop system. As an example, a plank can include circuitry.

As an example, a system can include a speaker, which may be a removable speaker that fits in a dock of the system (e.g., for charging, etc.). As an example, a removable speaker can be a wireless speaker with a battery or batteries that power wireless circuitry (e.g., BLUETOOTH, etc.) and where circuitry of the system may include wireless circuitry that can transmit audio information to the speaker for rendering by the speaker.

As an example, a plurality of operational modes can include a plurality of different projection directions. For example, consider a plurality of different projection directions that include one or more of a floor projection direction for projection of video onto a floor, a wall projection direction for projection of video onto a wall and a ceiling projection direction for projection of video onto a ceiling.

As an example, circuitry that operates to select one of a plurality of operational modes can select according to a schedule. For example, a schedule can include times that include operational mode on times and operational mode off times. As an example, a schedule can include times that include at least one transition time that transitions from one of a plurality of operational modes to another one of the plurality of operational modes.

As an example, a plurality of operational modes of a system can include a floor projection mode that includes a downward projection direction of an adjustable direction video projector with respect to gravity. As an example, a mirror or mirrors may be utilized for a projection direction, for example, consider the example of system 1600 of FIG. 16 where the mirror 1615 may be included such that a projection direction is aimed at the mirror 1615 (e.g., upwardly) and the ultimate projection direction is downwardly as projected illumination is reflected by the mirror 1615.

As an example, a plurality of operational modes can include a ceiling projection mode that includes an upward projection direction of the adjustable direction video projector with respect to gravity.

As an example, a plurality of operational modes can include a wall projection mode that includes a substantially horizontal projection direction of an adjustable direction video projector. Such a mode may be a far-wall mode. As an example, a plank system can include a wall side where a plurality of operational modes includes a short-range wall projection mode that includes a wall side projection direction of an adjustable direction video projector. In such an example, the plank system can include an above the plank mode and a below the plank mode. For example, consider the plank being a fireplace mantel where a fireplace wall can be utilized as a projection surface above the plank or below the plank where corresponding modes may be associated with a viewer's eye level. As mentioned, a below the plank mode may be suitable for a viewer seated in a chair or a sofa while an above the plank mode may be suitable for a viewer that is standing or sitting on a bar stool, etc. As an example, a below the plank mode may be for a smaller screen size than an above the plank mode, for example, as may be preset according to one or more screen size (e.g., projection size) settings, which may range from about 10 inches (e.g., approximately 25 cm) diagonally to about 200 inches or more (e.g., approximately 500 cm or more) diagonally.

As an example, a system can be a plank system defined by a length, a width and a height where the length is greater than the width and greater than the height and wherein the width is greater than the height.

As an example, an adjustable direction video projector can include a projection direction adjustment motor that is operatively coupled to the circuitry. As an example, a system can include multiple adjustment motors. As an example, a system can include one or more brushless DC motors, which may operate according to signals issued by a controller in response to selection of a mode by mode circuitry. As mentioned, a system can include a multi-axis gimbal system or gimbal-like system, which may be utilized for one or more purposes. As mentioned, such a multi-axis system can be utilized to adjust a projection direction responsive to mode selection and/or to stabilize a projection direction where the system is in an environment that is subjected to movement (e.g., a boat, a ship, an RV, a plane, etc.).

As an example, an adjustable direction video projector can include multiple projection lenses selectable by circuitry. As an example, consider a ring of lenses that can be rotatable for use or a string of lenses that can be translatable for use.

As an example, a system can include a component bay. For example, consider a system that includes wireless circuitry disposed in the component bay. As an example, consider a router and/or modem disposed in a component bay where the router and/or modem can receive and transmit information (e.g., via cable, via cellular, via DSL, etc.). As an example, a system can include hotspot circuitry, access point circuitry, wireless router circuitry (e.g., for WiFi, etc.), etc.

As an example, a system can include one or more types of finishes. For example, consider one or more of veneer, decaled, painted, hot stamping, skin, etc., types of finishes.

As an example, a system can include charging circuitry. Such circuitry may be for charging an internal battery or batteries. As an example, charging circuitry may be for charging a component that includes a battery where the component may be removable from the system and optionally utilized with the system (e.g., a remote control, a wireless speaker, a tablet, a PDA, a laptop, a cellphone, etc.). As an example, charging circuitry can include inductive charging circuitry. In such an example, a region on a top side of a plank system can be utilized for placing of an electronic device or battery such that the circuitry can charge a battery of the electronic device or the battery, where such electronic device or battery includes appropriate reception circuitry (e.g., induction coupling circuitry, etc.).

As an example, a system can include a user interface, which may be a graphical user interface (GUI). As an example, a system can include touch sensing circuitry and/or voice sensing circuitry. As to touch sensing, the system may include a region or regions that can be touched to activate one or more circuits, select one or more modes, etc. As an example, a region or regions may be discrete or hidden such as not to detract from aesthetics of the system. For example, consider a left side or a right side being touch sensitive to receive a touch signal as input to instruct the system to perform one or more actions (e.g., turn on, turn off, enter a mode, etc.).

As an example, an adjustment mechanism of a plank system may be adjustable via touch. For example, consider the a top side being touch sensitive for input to adjust an adjustable projection video projector upwardly and a bottom side being touch sensitive for input to adjust the adjustable projection video projector downwardly. Such an approach can be intuitive and allow for ease of adjustment of a projection direction, for example, to fine tune a direction associated with a selected mode. As an example, touch sensing circuitry may be utilized for selection of a mode. For example, consider touch sensing circuitry that can sense a bottom side touch to select a mode that projects downwardly and touch sensing circuitry that can sense a top side touch to select a mode that projects upwardly. In such an example, a user may simply touch a top side region of a plank system to cause circuitry of the plank system to select a ceiling mode or an above the plank wall mode and the user may simply touch a bottom side region of the plank system to cause circuitry of the plank system to select a floor mode or a below the plank wall mode. As an example, a system may include programmable settings that allow for a user to associate touch/touch region(s) with one or more modes, which can facilitate a user's ability to control such a system via touch input. As mentioned, a system can be "self-aware". In such an example, the system may act to program itself via scanning of an environment. In such an example, where a user desires to tune the self-aware-based settings, a user interface may be rendered using the system (e.g., via projection, a user interface region, a cellphone app, a remote control, etc.) for such tuning.

As an example, a plank can include a user interface that is or includes a graphical user interface.

As an example, a system can include a plurality of operational modes that include an emergency mode. In such an example, the system can include a battery where the emergency mode operates via power supplied by the battery. As an example, an emergency mode can include a floor projection direction for illumination of a floor. As an example, an emergency mode can include a floor projection direction for projection of a pattern onto a floor. As an example, a system can include a battery and airwave broadcast reception circuitry where, in an emergency mode, the airwave broadcast reception circuitry operates via power supplied by the battery. As an example, in an emergency mode, an adjustable direction projector can project emergency information, which may be received via one or more types of circuitry, depending, for example, availability of signals, availability of power, etc.

As an example, a system can include a battery and wireless cell communication circuitry, where, in an emergency mode, the wireless cell communication circuitry operates via power supplied by the battery. As an example, the wireless cell communication circuitry (e.g., cellular communication circuitry) can include XG (e.g., 3G, 4G, etc.), long-term evolution (LTE), or other type of circuitry. As an example, a system can include one or more subscriber identity module (SIM) cards (e.g., SIM circuitry). As an example, a system can include remote access circuitry, which may be via one or more types of networks (e.g., cable, digital subscriber line (DSL), satellite, cellular, etc.). As an example, a system may include a phone number. As an example, in an emergency mode, a system may issue one or more outgoing notifications to one or more addresses (e.g., email, Internet protocol (IP), etc.) and/or one or more phone numbers.

As an example, a system can include wireless cell communication circuitry that is programmed to communicate with an emergency information source (e.g., emergency management system, a subscriber system, etc.). As an example, an adjustable direction video projector can automatically project video that includes emergency information communicated by the emergency information source.

As an example, emergency information can include one or more of weather information, utility service information, evacuation information, traffic information, tsunami information, earthquake information, fire information, air quality information, etc.

As an example, in an emergency mode, an adjustable direction video projector can project evacuation information, which may include information as to the environment, the structure, the neighborhood, etc. As an example, an adjustable direction video projector can project evacuation information at least in part downwardly with respect to gravity. For example, consider floor projection where the floor projection can include direction information as to how a person should evacuate an environment. As mentioned, where a system is "self-aware", as via a scanning mode, the system may automatically determine an evacuation direction, as it may be aware of a door, doors, a window, windows, etc. As an example, a system may be programmed or otherwise aware of being on a particular floor (e.g., elevation). For example, GPS circuitry may be included in a system where the system can become aware of its elevation and/or altimeter circuitry may be included where the system can become aware of its elevation. In such examples, a system can "know" via such circuitry and/or other programming that one or more windows may not be suitable for exit (e.g., depending on elevation). As an example, the system may be operatively coupled to a building system, a ship's system, etc., to receive and convey emergency information. In such examples, a system may render video that shows evacuation instructions for evacuating via upper floor(s), lower floor(s), elevator, stairs, ladder, lifeboats, etc.

As an example, a system can include or be operatively coupled to a smoke detector where one of a plurality of operational modes is selected responsive to a signal from the smoke detector. As an example, a system can include or be operatively coupled to a carbon monoxide detector where one of a plurality of operational modes is selected responsive to a signal from the carbon monoxide detector. As an example, a system can include or be operatively coupled to a gas detector where one of a plurality of operational modes is selected responsive to a signal from the gas detector. As an example, a system can include or be operatively coupled to a water leak detector where one of a plurality of operational modes is selected responsive to a signal from the water leak detector. As an example, a system can include or be operatively coupled to a bioinformation detector where one of a plurality of operational modes is selected responsive to a signal from the bioinformation detector. For example, consider a bioinformation detector that is a sleep state detector, a temperature detector, a heart rate detector, etc.

As an example, a system can include a video camera. In such an example, the system can include cellular communication circuitry operatively coupled to the video camera and an adjustable direction video projector.

As an example, a method can include, in a system that includes a plank and an adjustable direction video projector and that includes circuitry operatively coupled to the adjustable direction video projector that selects one of a plurality of operational modes of the adjustable direction video projector and that adjusts a projection direction of the adjustable direction video projector responsive to selection of the one of the plurality of operational modes, selecting the one of the plurality of operational modes according to a signal; and adjusting the projection direction responsive to the selecting of the one of the plurality of operational modes. In such an example, the signal may be view one or more sensors of the system (e.g., touch, motion, condition detector, etc.) and/or via one or more schedules, which may be stored locally and/or remotely as data structures to a memory device. As an example, such a method can include selecting another one of the plurality of operational modes according to another signal and/or the schedule and adjusting the projection direction responsive to the selecting of the other one of the plurality of operational modes. As an example, a method can include receiving a signal by a system and selecting one of a plurality of operational modes of the system based at least in part on the signal, where the system may be in a dormant state or in another one of the plurality of operational mode such that a change in state and/or a change in mode occurs.

As described herein, various acts, steps, etc., may be implemented as instructions stored in one or more computer-readable storage media where a computer-readable storage medium is not a signal. For example, one or more computer-readable storage media can include computer-executable (e.g., processor-executable) instructions to instruct a device. A computer-readable medium may be a computer-readable medium that is not a carrier wave.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium.

While various examples of circuits or circuitry have been discussed, FIG. 18 depicts a block diagram of an illustrative computer system 1800. The system 1800 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1800. As an example, a system such as the system 100, the system 1600, the system 1700, etc., may include at least some of the features of the system 1800.

As shown in FIG. 18, the system 1800 includes a so-called chipset 1810. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 18, the chipset 1810 has a particular architecture, which may vary to some extent depending on brand or manufacturer. The architecture of the chipset 1810 includes a core and memory control group 1820 and an I/O controller hub 1850 that exchange information (e.g., data, signals, commands, etc.) via, for example, a direct management interface or direct media interface (DMI) 1842 or a link controller 1844. In the example of FIG. 18, the DMI 1842 is a chip-to-chip interface (sometimes referred to as being a link between a "northbridge" and a "southbridge").

The core and memory control group 1820 include one or more processors 1822 (e.g., single core or multi-core) and a memory controller hub 1826 that exchange information via a front side bus (FSB) 1824. As described herein, various components of the core and memory control group 1820 may be integrated onto a single processor die, for example, to make a chip that supplants the conventional "northbridge" style architecture.

The memory controller hub 1826 interfaces with memory 1840. For example, the memory controller hub 1826 may provide support for DDR SDRAM memory (e.g., DDR, DDR2, DDR3, etc.). In general, the memory 1840 is a type of random-access memory (RAM). It is often referred to as "system memory".

The memory controller hub 1826 further includes a low-voltage differential signaling interface (LVDS) 1832. The LVDS 1832 may be a so-called LVDS Display Interface (LDI) for support of a display device 1892 (e.g., a CRT, a flat panel, a projector, etc.). A block 1838 includes some examples of technologies that may be supported via the LVDS interface 1832 (e.g., serial digital video, HDMI/DVI, display port). The memory controller hub 1826 also includes one or more PCI-express interfaces (PCI-E) 1834, for example, for support of discrete graphics 1836. Discrete graphics using a PCI-E interface has become an alternative approach to an accelerated graphics port (AGP). For example, the memory controller hub 1826 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

As an example, the system 1800 may include or be operatively coupled to a DLP sub-system (see, e.g., the DLP sub-system 1340 of FIG. 13) and/or may include or be operatively coupled to one or more adjustment mechanisms that include one or more electric motors (see, e.g., the adjustment assembly 1500 of FIG. 15, the adjustment mechanism 1630 of FIG. 16, etc.). As an example, processor-executable instructions can be stored in memory of a memory device accessible to a processor for execution to instruct a system (e.g., a plank system or another system) to select one of a plurality of operational modes of an adjustable direction video projector and adjust a projection direction of the adjustable direction video projector responsive to selection of the one of the plurality of operational modes. In such an example, a signal may be generated, received, etc., that causes the selection of one of the plurality of operational modes. Such a signal may, for example, be associated with a schedule and/or be associated with input via a sensor, which may be a detector. As an example, processor-executable instructions may be stored in memory of a memory device and executable by a processor to perform a method. For example, consider a method that includes selecting an operational mode and adjusting an adjustable direction video projector responsive to selection of the operational mode where such adjusting can include adjusting a projection direction. As an example, a method such as the method 910 of FIG. 9 may be performed at least in part via execution of processor-executable instructions stored in memory of a memory device.

The I/O hub controller 1850 includes a variety of interfaces. The example of FIG. 18 includes a SATA interface 1851, one or more PCI-E interfaces 1852 (optionally one or more legacy PCI interfaces), one or more USB interfaces 1853, a LAN interface 1854 (more generally a network interface), a general purpose I/O interface (GPIO) 1855, a low-pin count (LPC) interface 1870, a power management interface 1861, a clock generator interface 1862, an audio interface 1863 (e.g., for speakers 1894), a total cost of operation (TCO) interface 1864, a system management bus interface (e.g., a multi-master serial computer bus interface) 1865, and a serial peripheral flash memory/controller interface (SPI Flash) 1866, which, in the example of FIG. 18, includes BIOS 1868 and boot code 1890. With respect to network connections, the I/O hub controller 1850 may include integrated gigabit Ethernet controller lines multiplexed with a PCI-E interface port. Other network features may operate independent of a PCI-E interface.

The interfaces of the I/O hub controller 1850 provide for communication with various devices, networks, etc. For example, the SATA interface 1851 provides for reading, writing or reading and writing information on one or more drives 1880 such as HDDs, SDDs or a combination thereof. The I/O hub controller 1850 may also include an advanced host controller interface (AHCI) to support one or more drives 1880. The PCI-E interface 1852 allows for wireless connections 1882 to devices, networks, etc. The USB interface 1853 provides for input devices 1884 such as keyboards (KB), one or more optical sensors, mice and various other devices (e.g., microphones, cameras, phones, storage, media players, etc.). One or more other types of sensors may optionally rely on the USB interface 1853 or another interface (e.g., I$^2$C, etc.). As to microphones, the system 1800 of FIG. 18 may include hardware (e.g., audio card) appropriately configured for receipt of sound (e.g., user voice, ambient sound, etc.).

In the example of FIG. 18, the LPC interface 1870 provides for use of one or more ASICs 1871, a trusted platform module (TPM) 1872, a super I/O 1873, a firmware hub 1874, BIOS support 1875 as well as various types of memory 1876 such as ROM 1877, Flash 1878, and non-volatile RAM (NVRAM) 1879. With respect to the TPM 1872, this module may be in the form of a chip that can be used to authenticate software and hardware devices. For example, a TPM may be capable of performing platform authentication and may be used to verify that a system seeking access is the expected system.

The system 1800, upon power on, may be configured to execute boot code 1890 for the BIOS 1868, as stored within the SPI Flash 1866, and thereafter processes data under the control of one or more operating systems and application software (e.g., stored in system memory 1840). An operating system may be stored in any of a variety of locations and accessed, for example, according to instructions of the BIOS 1868. Again, as described herein, a satellite, a base, a server or other machine may include fewer or more features than shown in the system 1800 of FIG. 18. Further, the system 1800 of FIG. 18 is shown as optionally include cell phone circuitry 1895, which may include GSM, CDMA, etc., types of circuitry configured for coordinated operation with one or more of the other features of the system 1800. Also shown in FIG. 18 is battery circuitry 1897, which may provide one or more battery, power, etc., associated features (e.g., optionally to instruct one or more other components of the system 1800). As an example, a SMBus may be operable via a LPC (see, e.g., the LPC interface 1870), via an I$^2$C interface (see, e.g., the SM/I$^2$C interface 1865), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
   a plank that comprises a front side and a back side that define a depth, a top side and a bottom side that define parallel planes and a thickness, and an adjustable direction video projector, wherein the depth exceeds the thickness, and wherein the adjustable direction video projector is disposed at the front side and at least in part between the parallel planes; and
   circuitry operatively coupled to the adjustable direction video projector that selects one of a plurality of operational modes of the adjustable direction video projector and that adjusts a projection direction of the adjustable direction video projector responsive to selection of the one of the plurality of operational modes, wherein the plurality of operational modes comprise a back wall projection mode, wherein, in the back wall projection mode, the projection direction is directed at least in part between the parallel planes toward the back side of the plank for projection to a back wall surface.

2. The system of claim 1 wherein the plank is a shelf plank.

3. The system of claim 1 wherein the plank is a furniture plank.

4. The system of claim 3 wherein the furniture plank is a horizontal plank of at least one of a cabinet and a table.

5. The system of claim 1 wherein the plank comprises the circuitry.

6. The system of claim 1 comprising a speaker.

7. The system of claim 1 wherein the plurality of operational modes comprise a plurality of different projection directions.

8. The system of claim 7 wherein the plurality of different projection directions comprise a floor projection direction for projection of video onto a floor.

9. The system of claim 7 wherein the plurality of different projection directions comprise a wall projection direction for projection of video onto a wall.

10. The system of claim 7 wherein the plurality of different projection directions comprise a ceiling projection direction for projection of video onto a ceiling.

11. The system of claim 1 wherein the circuitry operates to select one of the plurality of operational modes according to a schedule.

12. The system of claim 11 wherein the schedule comprises times that comprise operational mode on times and operational mode off times.

13. The system of claim 11 wherein the schedule comprises times that comprise at least one transition time that transitions from one of the plurality of operational modes to another one of the plurality of operational modes.

14. The system of claim 1 wherein the plurality of operational modes comprise a floor projection mode, wherein, in the floor projection mode, the projection direction is directed outwardly away from the bottom side of the plank for projection to a floor surface parallel to the bottom side of the plank and wherein the back wall surface is orthogonal to the floor surface.

15. The system of claim 1 wherein the plurality of operational modes comprise a ceiling projection mode that comprises an upward projection direction of the adjustable direction video projector with respect to gravity.

16. The system of claim 1 wherein the plurality of operational modes comprise a wall projection mode that comprises a substantially horizontal projection direction of the adjustable direction video projector.

17. The system of claim 1 wherein the adjustable direction video projector comprises a projection direction adjustment motor that is operatively coupled to the circuitry to adjust the projection direction.

18. The system of claim 1 wherein the plurality of operational modes comprise an emergency mode.

19. The system of claim 1 comprising a bioinformation detector wherein one of the plurality of operational modes is selected responsive to a signal from the bioinformation detector.

20. A method comprising:
in a system that comprises a plank and an adjustable direction video projector and that comprises circuitry operatively coupled to the adjustable direction video projector that selects one of a plurality of operational modes of the adjustable direction video projector and that adjusts a projection direction of the adjustable direction video projector responsive to selection of the one of the plurality of operational modes, wherein the plank comprises a front side and a back side that define a depth, a top side and a bottom side that define parallel planes and a thickness, wherein the depth exceeds the thickness, and wherein the adjustable direction video projector is disposed at the front side and at least in part between the parallel planes, selecting the one of the plurality of operational modes according to a schedule, wherein the plurality of operational modes comprise a back wall projection mode, wherein, in the back wall projection mode, the projection direction is directed at least in part between the parallel planes toward the back side of the plank for projection to a back wall surface; and
adjusting the projection direction responsive to the selecting of the one of the plurality of operational modes.

* * * * *